US012606321B2

(12) United States Patent
Au

(10) Patent No.: US 12,606,321 B2
(45) Date of Patent: Apr. 21, 2026

(54) AIRCRAFT CONTROL SYSTEMS

(71) Applicant: Airbus Operations Limited, Bristol (GB)

(72) Inventor: Ting Yu Au, Bristol (GB)

(73) Assignee: Airbus Operations Limited, Filton (GB)

( * ) Notice: Subject to any disclaimer, the term of this patent is extended or adjusted under 35 U.S.C. 154(b) by 221 days.

(21) Appl. No.: 18/524,250

(22) Filed: Nov. 30, 2023

(65) Prior Publication Data

US 2024/0174381 A1 May 30, 2024

(30) Foreign Application Priority Data

Nov. 30, 2022 (GB) ...................................... 2218007

(51) Int. Cl.
B64F 5/60 (2017.01)

(52) U.S. Cl.
CPC ...................................... B64F 5/60 (2017.01)

(58) Field of Classification Search
CPC .......... B64F 5/60; B60T 8/1703; B60T 8/174; G06F 18/214; G06N 3/042; G06N 3/045; G06N 20/00; G05B 23/0245; G05B 23/0297
See application file for complete search history.

(56) References Cited

U.S. PATENT DOCUMENTS

2011/0107155 A1* 5/2011 Hirose .................... H04L 41/16
714/48
2013/0212674 A1* 8/2013 Boger ................. G09B 21/008
726/17

2017/0140169 A1* 5/2017 Boger ................. G06F 3/04886
2020/0250905 A1* 8/2020 Sundareswara ........ G07C 5/085
2021/0174612 A1 6/2021 Wilmering
2021/0278834 A1* 9/2021 Kendoul ............. G05D 1/0044
2021/0287141 A1 9/2021 Molloy
(Continued)

FOREIGN PATENT DOCUMENTS

CN 112070138 A 12/2020
CN 113516227 A 10/2021
CN 114329232 A 4/2022
(Continued)

OTHER PUBLICATIONS

European Search Report and Written Opinion for EP Application No. 23213493, mailed Apr. 22, 2024, 6 pages.
(Continued)

*Primary Examiner* — Mary Cheung
(74) *Attorney, Agent, or Firm* — KDW Firm PLLC

(57) ABSTRACT

A test system for modifying a graph-based trained classifier, configured to output control data for controlling the aircraft system according to a graph model representing the aircraft system. The test system is configured to obtain scenario data, control data, and validation data. The test system generates a custom loss score based on differences between the validation data and the control data and modifies the graph-based trained classifier based on the custom loss score, the scenario data, and the control data. A computer-implemented method for modifying the graph-based trained classifier and a storage medium comprising instructions to perform the method are also provided.

23 Claims, 13 Drawing Sheets

(56) References Cited

U.S. PATENT DOCUMENTS

| | | | |
|---|---|---|---|
| 2022/0180172 A1 | 6/2022 | Eykholt | |
| 2023/0022505 A1 * | 1/2023 | Howell | .................. B64C 13/00 |

FOREIGN PATENT DOCUMENTS

| | | | |
|---|---|---|---|
| CN | 114861764 A | 8/2022 | |
| EP | 2149824 A2 * | 2/2010 | ............. G05B 17/02 |
| EP | 3835904 A1 | 6/2021 | |
| GB | 2590671 A | 7/2021 | |
| WO | WO-2021130061 A1 * | 7/2021 | ............. B64D 31/06 |

OTHER PUBLICATIONS

British Search Report for Application No. 2218007 dated May 31, 2023.

* cited by examiner

200

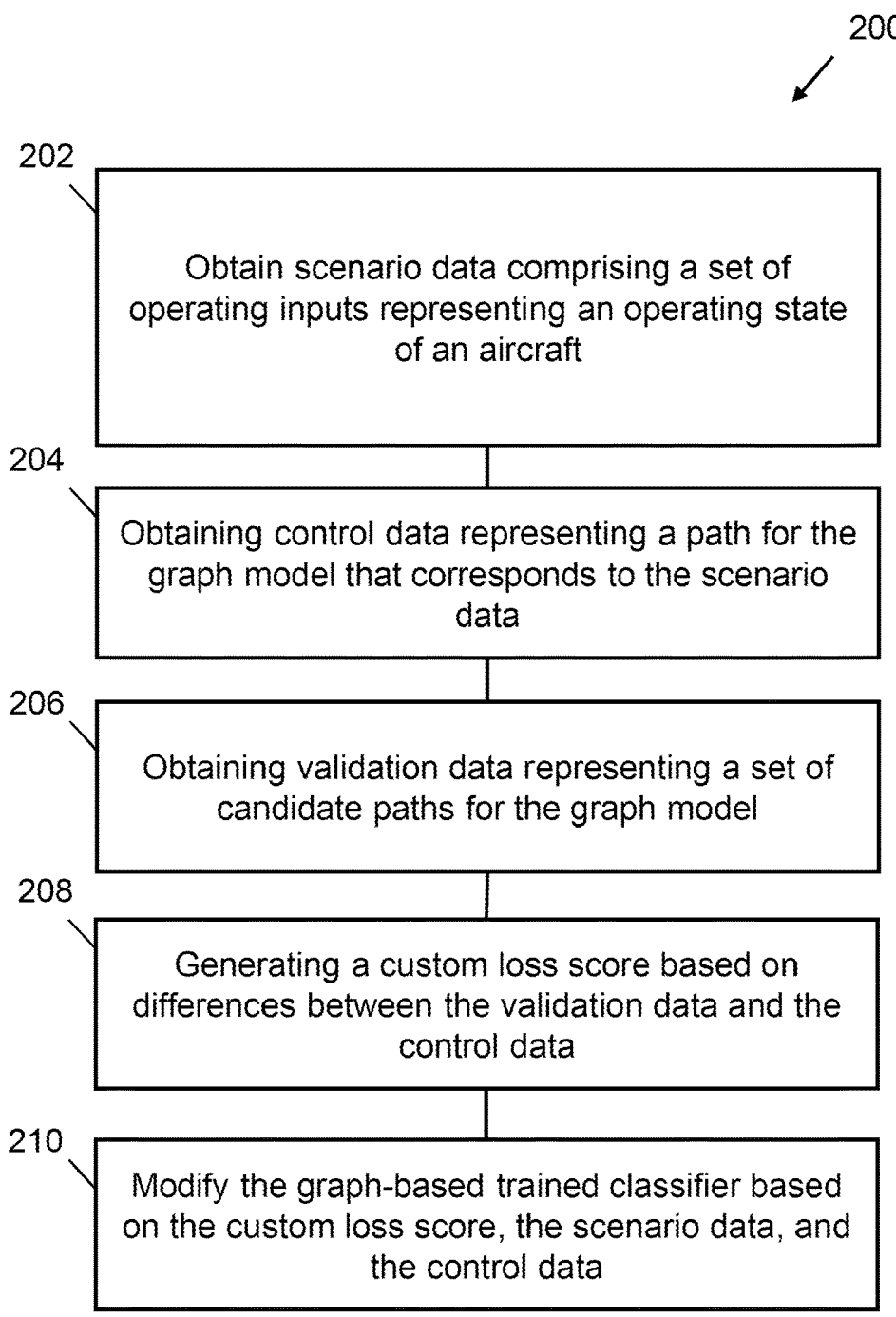

202

Obtain scenario data comprising a set of operating inputs representing an operating state of an aircraft

204

Obtaining control data representing a path for the graph model that corresponds to the scenario data

206

Obtaining validation data representing a set of candidate paths for the graph model

208

Generating a custom loss score based on differences between the validation data and the control data

210

Modify the graph-based trained classifier based on the custom loss score, the scenario data, and the control data

304 Generate Training Scenarios

302 Training Scenarios

306 Generate Training Dataset

308 Training Dataset

312 Classifier

310 Train Classifier

314 Trained Classifier

316 Modify Trained Classifier

1100

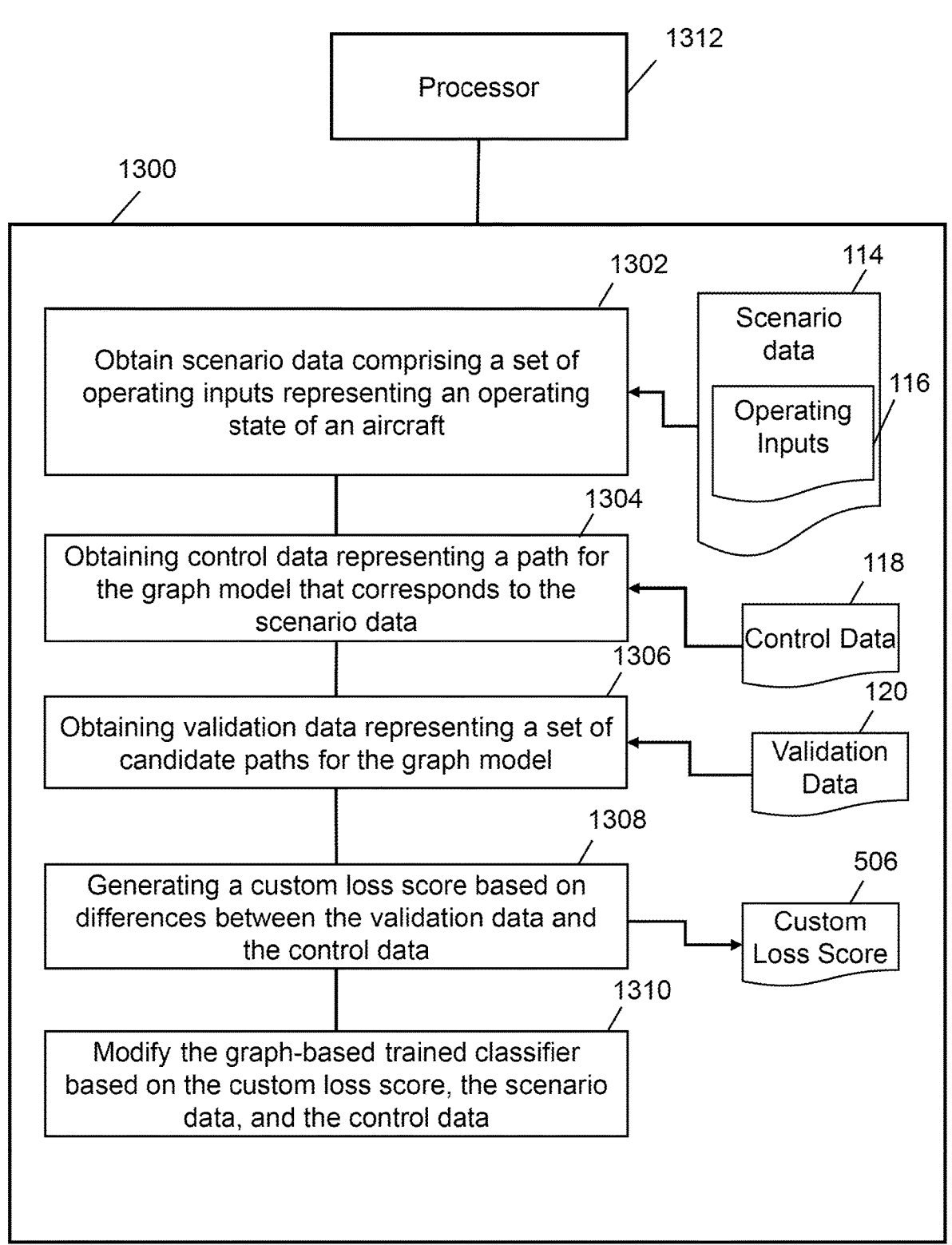

1312

Processor

1300

1302

Obtain scenario data comprising a set of operating inputs representing an operating state of an aircraft

114

Scenario data

Operating Inputs

116

1304

Obtaining control data representing a path for the graph model that corresponds to the scenario data

118

Control Data

1306

Obtaining validation data representing a set of candidate paths for the graph model

120

Validation Data

1308

Generating a custom loss score based on differences between the validation data and the control data

506

Custom Loss Score

1310

Modify the graph-based trained classifier based on the custom loss score, the scenario data, and the control data

*FIG. 13*

AIRCRAFT CONTROL SYSTEMS

TECHNICAL FIELD

The present disclosure relates to aircraft control systems. In particular, but not exclusively, the present disclosure relates to tuning trained classifiers for use in aircraft control systems.

BACKGROUND

An aircraft typically comprises control systems, which are developed by devising rules to govern the operation of the aircraft control system in a range of scenarios and coding these rules into the aircraft control system. Developing these control systems generally involves a considerable amount of time and planning. While techniques involving artificial intelligence may be employed and may decrease the time taken to develop such systems, sufficient trust has to be afforded to such techniques before they are considered to be dependable.

SUMMARY

A first aspect of the disclosure herein provides a test system for modifying a graph-based trained classifier that is configured to control an aircraft system according to a graph model representing the aircraft system, wherein the graph-based trained classifier is configured to output control data for controlling the aircraft system in response to a set of operating inputs representing an operating state of an aircraft, the control data representing a path for the graph model, and wherein the test system comprises at least one memory and at least one processor, the test system comprising program code stored in the at least one memory and that, when executed by the at least one processor, causes the test system to: obtain scenario data comprising a set of operating inputs representing an operating state of an aircraft; obtain control data representing a path for the graph model that corresponds to the scenario data; obtain validation data representing a set of candidate paths for the graph model; generate a custom loss score based on differences between the validation data and the control data; and modify the graph-based trained classifier based on the custom loss score, the scenario data, and the control data.

In this way, the performance of a trained classifier which is to be used to operate at least part of an aircraft system can be tuned based on a custom loss function. The trained classifier may be trained based on a set of operating scenarios in which operating inputs, representing a scenario, and a corresponding set of expected outputs are used to train the classifier. While the classifier may be sufficiently reliable in generating a path in response to a new set of operating inputs based on this training alone, fine-tuning as described herein may be used to further refine the outputs and provides an opportunity to more heavily penalize invalid, or incorrect, outputs produced by the classifier. The reliability of the trained classifier, and in turn the aircraft control system, may therefore be increased. Further, using a custom loss score in this way, in combination with the training already performed on the classifier, can speed up the process for achieving a desired reliability in the classifier.

Optionally, the graph model comprises a set of nodes connected by a corresponding set of edges, and wherein each node represents a function of a component in the aircraft system.

Graph models provide efficient ways for representing aircraft control systems that are highly configurable and able to be processed efficiently by trained classifiers. This allows the trained classifier to obtain an understanding of the implications of a given operating scenario on the options for controlling the aircraft system. Modifications to the graph model allow operating scenarios to be readily represented and simplify the process for inspecting the performance of the trained classifier in relation to the given scenario.

Optionally, obtaining the control data comprises processing the set of operating inputs using the graph-based trained classifier, and wherein the control data includes a classifier output matrix comprising a plurality of elements, each element in the classifier output matrix corresponds to a respective node in the graph model, and a value provided for a said element is indicative of an operational state of the respective function of the component associated with the respective node.

Matrices provide efficient means to represent paths in a graph model. By indexing each node with an associated element in the matrix, and assigning a value, e.g. 0 or 1, to each element it becomes possible to easily identify which nodes are activated and which nodes remain inactive in the path generated by the classifier. These values also allow mathematical operations to be directly applied to the outputs from the classifier to determine a custom loss score.

Optionally, the validation data includes a path validation matrix, the path validation matrix being segmented into portions, each portion representing a respective candidate path for the graph model and comprising a plurality of elements, each element in a said portion of the path validation matrix corresponds to a respective said node in the graph model, and a value provided for a said element in the portion is indicative of an operational state of the respective function of a component associated with the respective node.

In this way, a single matrix can be used to represent a plurality of candidate paths included in the validation data, thereby simplifying the processing to be performed with the control data to determine the custom loss score. These values allow the custom loss score to be directly derived from operations performed on the path validation matrix and the classifier output matrix.

Optionally, generating the custom loss score comprises: for each portion of the path validation matrix, performing an elementwise subtraction of the classifier output matrix to obtain a comparative matrix that is segmented into corresponding portions; processing the comparative matrix according to a modulus function to obtain absolute values for each element in the comparative matrix; for each portion of the comparative matrix, summing the values of the respective elements to determine a loss score for the respective portion; and selecting the loss score with the lowest value to be the custom loss score.

This provides an efficient and robust method for determining a custom loss score from a direct comparison of the control data and the validation data which can be used to tune the trained classifier. Where the path represented by the control data is the same as at least one of the candidate paths in the validation data, the loss score can be low so that the output of the classifier is not penalized. Where the path represented by the control data is different to all candidate paths in the validation data, the loss score can be proportional to the differences between the control data and the most similar path in the validation data.

Optionally, each portion of the path validation matrix is a row in the path validation matrix, or each portion of the path validation matrix is a column in the path validation matrix.

In this way, the separation of the portions of the path validation matrix is simplified thereby reducing the need for complex referencing or indexing of the different portions of the path validation matrix.

Optionally, obtaining the validation data comprises: obtaining model data representing the graph model of the aircraft system; generating at least one candidate path by selecting nodes in the graph model that form a path from a start node to an end node, wherein generating the at least one candidate path excludes paths which do not satisfy a set of predetermined conditions; and representing the candidate path using a matrix for which each element in the matrix corresponds to a respective node in the graph model, and a value provided for each element represents an operational state of the function of the component associated with the respective node.

Generating the validation data in this way allows the system to actively exclude different types of errors from the validation data such that where an output generated by the classifier includes one of these types of errors, it can be quickly identified and assigned a loss score. Using the graph model representing the aircraft system to create the validation data ensure consistency between the potential outputs produced by the classifier and the validation data, while also making it easier to evaluate each path to determine whether it includes an error.

Optionally, the set of predetermined conditions are configured to exclude paths which correspond to at least one of the following: include an operation of two components in the aircraft system that are incompatible; include a simultaneous operation of a component in the aircraft system in an aircraft system according to two contradictory operation modes; include an operation of a component in the aircraft system that is not related to other operated components; and represent an incomplete operation of the aircraft system.

This allows different types of known errors to be selected for when producing the custom loss score. These errors may more generally relate to paths which are erroneous regardless of the operating inputs supplied for the given scenario. Which is to say that these errors are always erroneous behaviors and it is desired that the classifier never outputs a path that corresponds to these conditions.

Optionally, the control data represents a plurality of paths corresponding to the set of operating inputs, and wherein the control data includes a classifier output matrix comprising a plurality of elements, each element in the classifier output matrix being corresponds to a respective path for the graph model, and wherein a value provided for each element in the classifier output matrix represents a preference for the respective path.

This allows the test system to be applied to a trained classifier which is configured to select one of a plurality of candidate paths when generating control data for controlling the aircraft system. As above, the specific values used in the classifier output matrix enable a custom loss score to be derived from the output of the classifier. The different candidate paths may each be assigned a ranking by the trained classifier.

Optionally, the validation data includes a path validation matrix comprising a plurality of elements, each element in the path validation matrix corresponds to a candidate path for the graph model, and wherein a value provided for each element is indicative of an evaluation of the candidate path according to a condition.

As above, this enables the validation data to indicate which candidate paths are acceptable and which are not, and to penalize the trained classifier based on the magnitude of a preference for the paths which are not acceptable, according to the condition. The conditions may be specific to the scenario data, and in turn the operating inputs.

Optionally, generating the custom loss score based on differences between the validation data and the control data involves performing an elementwise comparison of the classifier output matrix with each portion of the path validation matrix.

This allows potential loss scores to be efficiently derived from the outputs of the trained classifier.

Optionally, generating the custom loss score comprises: performing an elementwise subtraction of the path validation matrix from the classifier output matrix to obtain a loss calculation matrix, wherein elements in the path validation matrix are subtracted from elements in the classifier output matrix that represent corresponding paths for the graph model; and selecting a value of a said element in the loss calculation matrix to be the custom loss score.

In this way, the custom loss score can be directly determined from the output of the classifier and with an evaluation that focuses on penalizing poor performance in a given scenario but without dictating what the desired path should be, which is already configured into the classifier in a previous training phase.

Optionally, obtaining the validation data comprises: obtaining at least one candidate path for the graph model, wherein the candidate paths exclude paths which do not satisfy a set of predetermined conditions; evaluating the at least one candidate path and assigning a value to the candidate path based on whether the path is indicative of an operation of a component in the aircraft system in a manner that is incompatible with the set of operating inputs; and generating the path validation matrix using the value assigned to the candidate path.

In this way it becomes possible to tune the trained classifier based on a scenario specific performance of the trained classifier.

A second aspect of the disclosure herein provides a computer-implemented method for modifying a graph-based trained classifier configured to control at least part of an aircraft system according to a graph model representing the aircraft system, wherein the graph-based trained classifier is configured to output control data for controlling the aircraft system in response to a set of operating inputs representing an aircraft operating scenario, the control data being representing a path for the graph model, and wherein the method comprises: obtaining scenario data comprising a set of operating inputs representing an operating state of an aircraft; obtaining control data representing a path for the graph model that corresponds to the scenario data; obtaining validation data representing a set of candidate paths for the graph model; generating a custom loss score based on differences between the validation data and the control data; and modifying the graph-based trained classifier based on the custom loss score, the scenario data, and the control data.

Optionally, the graph model comprises a set of nodes connected by a corresponding set of edges, and wherein each node represents a function of a component in the aircraft system.

Optionally, obtaining the control data comprises processing the set of operating inputs using the graph-based trained classifier, and wherein the control data includes a classifier output matrix comprising a plurality of elements, each element in the classifier output matrix corresponds to a respective node in the graph model, and a value provided for a said element is indicative of an operational state of the respective function of the component associated with the respective node.

Optionally, the validation data includes a path validation matrix, the path validation matrix being segmented into portions, each portion representing a respective candidate path for the graph model and comprising a plurality of elements, each element in a said portion of the path validation matrix corresponds to a respective node in the graph model, and a value provided for a said element in the portion is indicative of an operational state of the respective function of a component associated with the respective node.

Optionally, generating the custom loss score comprises: for each portion of the path validation matrix, performing an elementwise subtraction of the classifier output matrix to obtain a comparative matrix that is segmented into corresponding portions; processing the comparative matrix according to a modulus function to obtain absolute values for each element in the comparative matrix; for each portion of the comparative matrix, summing the values of the respective elements to determine a loss score for the respective portion; and selecting the loss score with the lowest value to be the custom loss score.

Optionally, the control data represents a plurality of paths corresponding to the set of operating inputs, and wherein the control data includes a classifier output matrix comprising a plurality of elements, each element in the classifier output matrix being corresponds to a respective path for the graph model, and wherein a value provided for each element in the classifier output matrix represents a preference for the respective path.

Optionally, the validation data includes a path validation matrix comprising a plurality of elements, each element in the path validation matrix corresponding to a candidate path for the graph model, and wherein a value provided for each element is indicative of an evaluation of the path according to a condition.

Optionally, generating the custom loss score comprises: performing an elementwise subtraction of the path validation matrix from the classifier output matrix to obtain a loss calculation matrix, wherein elements in the path validation matrix are subtracted from elements in the classifier output matrix that represent corresponding paths for the graph model; and selecting a value of a said element in the loss calculation matrix to be the custom loss score.

Optionally, the method further comprises deploying the graph-based trained classifier in an aircraft control system.

A third aspect of the disclosure herein provides a non-transitory computer-readable storage medium comprising computer-executable instructions which, when executed by at least one processor, cause the at least one processor to perform a computer-implemented method according to the second aspect.

A fourth aspect of the disclosure herein provides a computer-implemented method for modifying a graph-based trained classifier for operating a control system according to a graph model representing the control system, wherein the graph-based trained classifier is configured to output control data in response to a set of operating inputs representing an operating scenario for the control system, the control data representing a path for the graph model, and wherein the method comprises: obtaining scenario data comprising a set of operating inputs representing an operational state of the control system; obtaining control data representing a respective path for the graph model that corresponds to the scenario data; obtaining validation data representing a set of candidate paths for the graph model; generating a custom loss score based on differences between the validation data and the control data; and modifying the graph-based trained classifier based on the custom loss score, the scenario data, and the control data.

BRIEF DESCRIPTION OF THE DRAWINGS

Embodiments of the disclosure herein will now be described, by way of example only, with reference to the accompanying drawings noted below.

FIG. 2 is a flow chart of a computer-implemented method according to an example;

FIG. 13 is a schematic diagram illustrating a non-transitory computer-readable storage medium according to examples.

DETAILED DESCRIPTION

Figure 1:
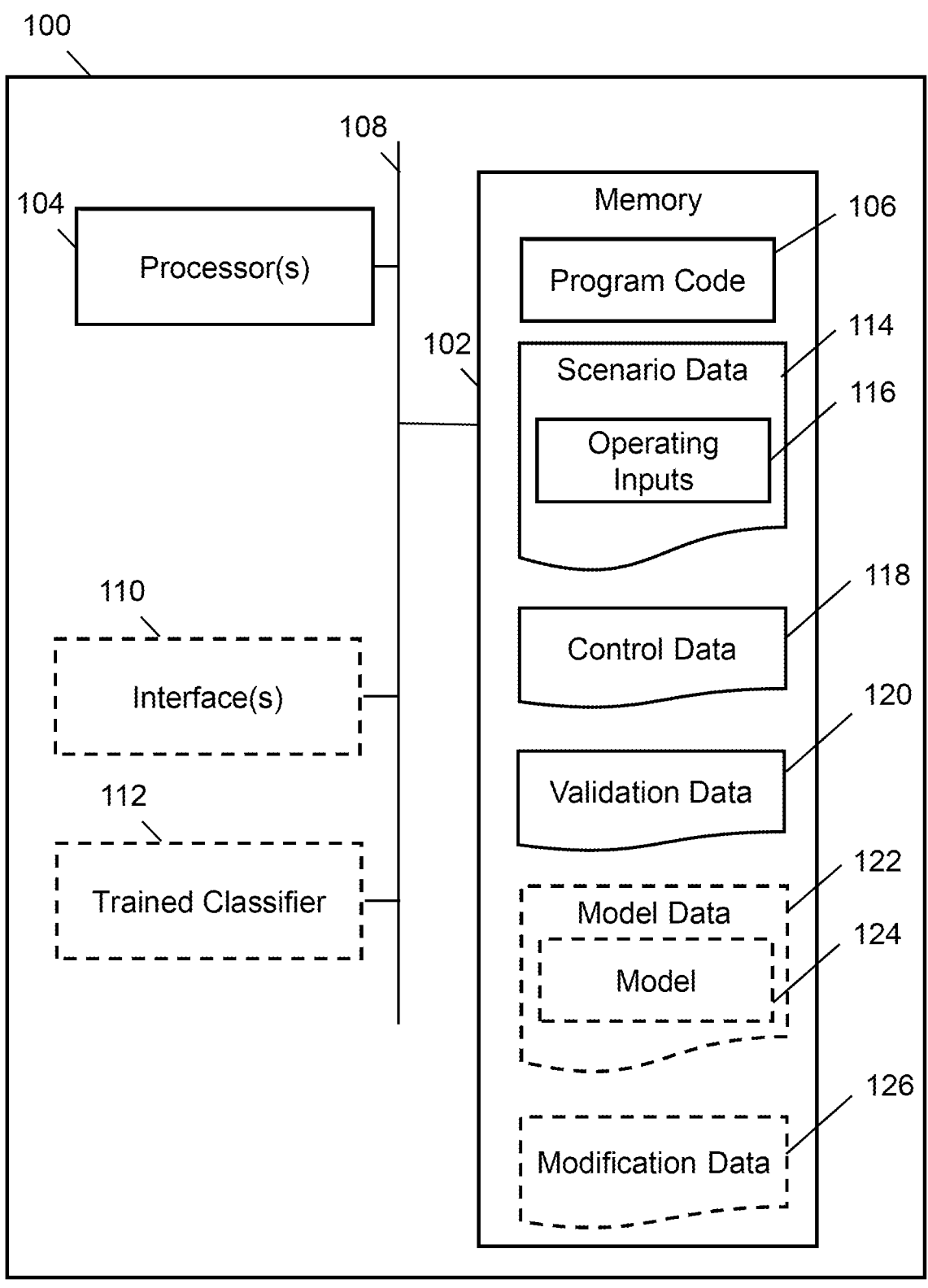
FIG. 1 is a schematic diagram of a test system according to an example.

Aircraft systems are becoming increasingly complex as performance and safety standards increase. As aircraft systems have grown in complexity, automation has been used, for example 'fly-by-wire', to assist pilots and improve safety of these aircraft. However, developing systems to provide the automation is commensurately increasingly complex and time-consuming.

Designers of aircraft control systems, which are used to provide the automation, are considering the inclusion of trained classifiers in aircraft control systems. The use of artificial intelligence in aircraft control systems, such as through the use of trained classifiers, may be beneficial, for example, to operate an aircraft efficiently even in scenarios that are outside normal operating conditions. Further, aircraft control systems employing artificial intelligence may not be bound by the experience of designers of these systems and so may be capable of identifying and operating the aircraft in more efficient ways than other aircraft control systems which are designed to a fixed specification. This is particularly the case when a new aircraft is being designed, since at least some design parameters associated with existing types of aircraft may not apply to a new aircraft design.

Trained classifiers implemented in aircraft control systems may include any of a plurality of different types of classifiers, such as neural networks, random forest algorithms, naïve Bayes classifiers, support vector machines, linear regression machine learning algorithms or any other suitable algorithm or classifier which is suitable for the function(s) described herein. When a classifier is to be trained to produce an output in accordance with a graph model, including a set of nodes and respective connecting edges, certain classifier types and classifier architectures have been found to be more suitable than others. For example, Graph Neural Networks (GNNs), are types of neural networks that are specifically configured to apply deep learning techniques to graphs. There are many known types of GNNs including Graph Convolutional Networks (GCNs), Graph Attention Networks (GATs), Temporal Graph Networks (TGNs), Message Passing Neural Networks (MPNNs).

While examples above are given for graph-based neural networks, it is to be appreciated that other classifier types may also have graph-based, or graph suitable, architectures, which are designed specifically for use with graph models. For example, graph-regularized support vector machines (GESVM), graph embedded extreme learning machine algorithms (GEELM), and so forth.

When developing aircraft control systems that include trained classifiers, it has been found that representing the aircraft control systems using graph models and deploying trained classifiers that are graph-based and trained using these graph models provides capable and efficient aircraft control systems.

When implementing new aircraft control systems, classifiers which are to be included in these aircraft control systems are trained on scenario data representing a plurality of operating scenarios for the aircraft and with corresponding target behaviors for each of the given scenarios. During the development phase, the difference, or loss, between the target behaviors and the output from the classifier for a given scenario, is used to train the classifier such that the classifier generates outputs more in-line with the target, or desired, behaviors in each scenario. This training method aims to tailor the performance of the classifier, once trained, to act in a manner that is in accordance with the desired behavior of the aircraft control system.

Training the classifier in this way has been found to produce reliable and predictable classifiers which are suitable for operating control systems. In some very specific circumstances, such as when the trained classifier encounters operating scenarios which are outside of those scenarios used to train the classifier, it may be possible for the trained classifier to produce an undesirable output. In addition to training the classifier to act, and produce outputs, in accordance with a target behavior defined in scenario data, it has been found to be desirable to specifically tune, or modify, the trained classifier to avoid outputs which are outside of desired operating procedures.

Certain examples described herein relate to a test system for modifying a graph-based trained classifier that is configured to control an aircraft system, or to more-generally operate a control system according to a graph model representing that control system. The test system uses a custom loss function to calculate a loss between an output generated by the trained classifier and one or more validation datasets, or conditions.

The validation datasets may not specify a desired output for the trained classifier, but may exclude outputs which are known to be undesirable. Some outputs may be understood to be undesirable in all scenarios, whereas in other cases, a given output may only be undesirable for specific circumstances, or in specific scenarios. These undesirable outputs may generally be categorised into error types. Where the classifier produces an output that is considered to be one of these error types, the loss score will be configured to penalize this behavior from the classifier. In this way, the validation data sets are not used to specify what the output from the trained classifier should be, but rather allow behaviors which are unacceptable to be penalized. Diversifying the development of the trained classifiers by modifying, or tuning, them in this way, once the classifier has been trained, produces a trained classifier that is more reliable, consistent, and can be afforded more trust in critical applications. This may also allow the performance of the classifier to be further tuned, or refined, while mitigating over-training of the trained classifier, which can otherwise occur if the trained classifier is very prescriptively trained using a desired output for every conceivable scenario.

During a development cycle for a graph-based trained classifier, after the classifier has been initially trained to control an aircraft system, it is tested to see if it works appropriately for controlling that aircraft system in a plurality of scenarios. In some of the tests which are performed, the trained classifier may provide an output which does not correctly control the aircraft system. These outputs are referred to as errors. Mitigating the occurrence of these errors is desirable.

FIG. 1 shows test system 100 comprising at least one memory 102, at least one processor 104, and program code 106 stored in the at least one memory 102. The at least one memory 102 includes any suitable combination of transitory and non-transitory storage for storing the program code 106, including random-access memory (RAM), read-only memory (ROM), synchronous dynamic random-access memory (SDRAM), or any other suitable type of memory. The at least one processor 104 may include any one or more of a central processing unit (CPU), a graphics processing unit (GPU), an application specific instruction set processor (ASIP) or any other suitable processing device. The memory 102 and the processor(s) 104 are communicatively coupled over a communications system 108 such as a bus.

The test system 100 may comprise at least one interface 110, shown in broken lines in FIG. 1. Such an interface 110 may be operable to communicate with one or more external computing devices and/or at least part of an aircraft system. The interface(s) 110 may also include a user interface 110 for providing information to a user and/or receiving instructions from a user. In an example, the user interface comprises a graphical display for displaying system information such as status information and/or at least one user input device to receive an input from a user to control the test system 100. The test system 100 is shown in FIG. 1 as a single device. However, it is to be understood that the test system 100 may comprise distributed computing devices, for example a plurality of distributed computing devices communicatively coupled over a wired or wireless network.

The program code 106 stored in the memory 102, when executed by the processor(s) 104, causes the test system 100 to perform a method for modifying a graph-based trained classifier 112. The trained classifier 112 is shown in FIG. 1 as being included in the test system 100, for example, in the form of a suitable combination of processing circuitry and computer-executable instructions. It will be appreciated that the classifier 112 may not be included in the test system 100 but may be in communication with the test system 100, for example, using the interface 110.

The memory 102 may also be used to store scenario data 114, comprising operating inputs 116, control data 118, and validation data 120. In some examples, the memory 102 also stores model data 122 representing a model 124 of at least part of an aircraft system. The model 124 may be a graph model including a plurality of nodes connected by a corresponding set of edges, wherein each node represents a function of a component in an aircraft system. The method for modifying the trained classifier, implemented by the test system 100, will be described below with respect to FIGS. 2 to 12

The graph-based trained classifier 112 is configured to output control data 118 for controlling an aircraft system in response to a set of operating inputs 116 representing an operating state of an aircraft. For example, the operating inputs 116 may represent changes to the availability of components in the aircraft system, such as where a primary control system is unavailable and a secondary or redundant system is to be used instead, where a certain component is only able to be operated in a restricted set of modes, where specific components are unavailable, and so forth. These operating inputs 116 may also represent environmental conditions which may restrict or modify the functions which should or can be operated in the aircraft system. The control data 118 generated by the trained classifier may represent a path, in the form of a set of nodes and/or edges, for a graph model representing the aircraft system.

Figure 3:
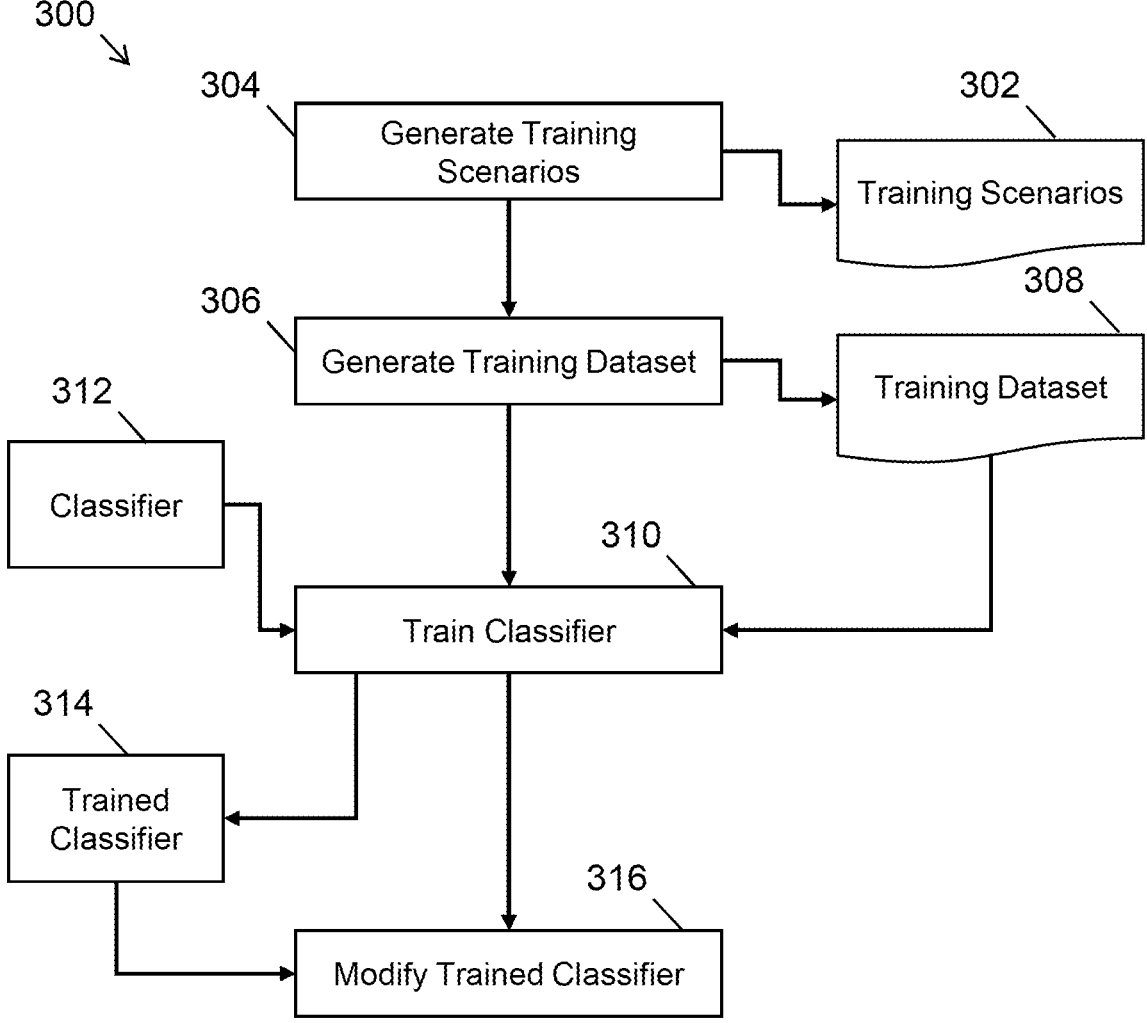
FIG. 3 is a schematic diagram illustrating a pipeline for training a classifier for an aircraft control system method according to an example.

FIG. 2 shows a computer-implemented method 200, which is implemented by the test system 100 using the program code 106, in the form of a flow chart, while FIG. 3 shows the context of developing an aircraft control system in which the method 200 is performed.

Turning briefly to FIG. 3, the process 300 for developing a control system, such as an aircraft control system, that includes a trained classifier 112 is shown. At a first stage a set of training scenarios 302 are generated 304. These training scenarios may include a set of operating inputs representing an operating state of an aircraft similar to that which will be described below with respected to the method 200 shown in FIG. 2. These training scenarios 302 are used to generate 306 a training dataset 308. The training dataset 308 includes, for each training scenario 302, a set of operating inputs and operating outputs, representing a desired control behavior for controlling the aircraft system in response to the given training scenario. These operating outputs may be based on known, and in some cases rules-based, aircraft control systems, and or developer's knowledge.

This training dataset 308 is then used to train 310 a classifier 312 to obtain a trained classifier 314 that is capable of controlling an aircraft system. This trained classifier 314 may be tested and trained until it reaches a desired level of performance and reliability. The trained classifier 314 may then be modified 316, or recalibrated, to increase its reliability. It is this modification 316 that is performed by the test system 100 described herein.

Returning to FIG. 2, the method 200 comprises obtaining 202 scenario data 114 comprising a set of operating inputs 116 representing an operating state of an aircraft. An operating state of an aircraft may include a state of one or more components in or on the aircraft as well as indications of environmental conditions in which the aircraft is operating. As described above, these operating inputs 116 may represent restrictions on the operation of one or more aircraft system, for example, indicating that one or more components are unavailable, are restricted to a subset of operational modes, or that there is a prioritisation of one or more of the components. The operating inputs 116 may specify modifications to a graph model 124 representing the aircraft system. In this way, a given scenario is specified, and the trained classifier 112 is configured to decide a manner in which to operate the aircraft system in response to this scenario.

According to the present example, the operating inputs 116 represent at least one of an operational state of at least one component associated with the aircraft system and an output from at least one sensor configured to sense a respective environmental condition. The operational state of the aircraft may be an instantaneous state of the aircraft, wherein the operating inputs 116 represent a state of one or more components or environmental conditions at a given moment, or at consecutive moments, in time. Alternatively, the operating inputs 116 may represent a dynamic state of an aircraft, wherein the operating inputs 116 comprise values representing a period of time in the operation of the aircraft, in which case the operating inputs 116 comprises a plurality of dynamically changing values representing each input.

The operating inputs 116 may include control inputs. Such a control input may be representative of aircrew, such as a pilot, operating or actuating a device, apparatus or system in the aircraft. Control inputs may include a value of a control input, for example, a value representing the position of a throttle, a braking actuator, and/or other control inputs. Alternatively, or additionally, a control input may comprise a rate of change rather than a value. In some examples, the control input may be a multivariate quantity indicating both an instantaneous value (e.g. a position) and a rate and/or direction of change. The control input may be represented by a plurality of values or a plurality of multivariate quantities expressing an operation of a device, apparatus or system over a defined period. The control input may include a value representing a difference between the control input and a further control input, for example a difference between the position of a first throttle corresponding to a first engine and the position of a second throttle corresponding to a second engine.

In the example shown in FIG. 1, the scenario data 114 is stored in the memory 102. In this case, obtaining the scenario data 114 may comprise reading the scenario data 114 from the memory 102. In other examples, not shown, obtaining 202 the scenario data 114 includes receiving the scenario data 114 using the interface(s) 110. The scenario data 114 may be transmitted to, and received by, the test system 100 over a communications interface 110 configured to communicate with one or more external computing devices over a wired or wireless connection.

The method 200 includes obtaining 204 control data 118 representing a respective path for the graph model that corresponds to the scenario data 114. The control data 118 may be generated by processing the operating inputs 116 using the trained classifier 112. In a first example, the control data 118 represents a single path for the graph model 124, wherein the path is indicative of which components in the aircraft system are to be operated when the operating state of the aircraft is that indicated according to the scenario data 114. This may be the case where the graph-based trained classifier 112 is a multi-class classifier. This example will be described in further detail with respect to FIGS. 5 to 9 which illustrate this example. In a second example, such as where the graph-based trained classifier 112 is a multi-label classifier, the control data 118 may represent a ranking of a plurality of different paths for the graph model 124 that correspond to the scenario data 114. This example will be described further below with respect to FIGS. 10 to 12.

The control data 118 may be suitable for controlling an aircraft system, by indicating what functions of components in the aircraft system are to be activated in the scenario. For example, the control data 118 may represent signals, or low-level computing instructions, for actuating equipment or components in the aircraft system. Alternatively, the control data 118 may represent high-level computing instructions which are used to control a fly-by-wire aircraft system.

The validation data 120 representing a set of candidate paths for the graph model is obtained 206. The candidate paths may include paths which a would-be valid paths for at least one operating scenario. For example, there may be certain conditions which are applied to the candidate paths to exclude any paths which exhibit a behavior or output that is inconsistent with design goals, and or operating standards expected of the aircraft control system. The validation data 120 may be obtained from one or more external computing system, not shown, using the interface 110.

Alternatively, the test system 200 may be configured to generate the validation data 120. The validation data 120 will generally correspond to the type of control data 118 being used in the specific example. As mentioned above, a first example is described below with respect to FIGS. 5 to 9 and a second example is described with respect to FIGS. 10 to 12. Examples of generating the validation data 120 will be described below in accordance with the respective classifier examples to which it relates.

A custom loss score is then generated 208 based on differences between the validation data 120 and the control data 118. The custom loss score will generally reflect a degree to which the behavior of the trained classifier 112 deviates from the expected or allowable behavior for the given scenario. For example, a large absolute value for the custom loss score will generally indicate that the control data 118 generated by the trained classifier 112 deviates significantly from the validation data 120. A small absolute value for the custom loss score will indicate that the control data 118 deviates less significantly from the validation data 120. A custom loss score of zero will indicate that the control data 118 is aligned with the validation data 118. The custom loss score will typically be a positive value, though in some cases may be negative depending on the specific custom loss function used to obtain the custom loss score.

The calculation for the custom loss score will generally depend on the format and content of the control data 118 and the validation data 120. As such, specific examples for calculating the custom loss score will be described further below with respect to FIGS. 5 to 9 and FIGS. 10 to 12 respectively.

The graph-based trained classifier 112 is modified 210 based on the custom loss score, the scenario data 114 and the control data 118. This may include tuning, or modifying, variables or weight values in the trained classifier 112 to minimise the loss score. The graph-based trained classifier 112 will typically include plurality of variables which define the classifier 112 and are used to process inputs. In the case of graph neural networks these variables may be weight values associated with nodes in the graph neural network.

In some cases, the process of modifying the graph-based trained classifier 112 may involve iteratively modifying some characteristics of the trained classifier 112, regenerating the control data 118 using the updated trained classifier 112, and comparing the new control data 118 with the validation data 120 to obtain an updated custom loss score. This process may be performed iteratively until the custom loss score is zero. Further optimisation algorithms may be employed in this circumstance to modify the graph-based trained classifier 112 in an effort to reduce the custom loss score. Alternatively, the process may be performed until the custom loss score is below a certain threshold value. The threshold value may be a predetermined value, representing a desired measure of reliability in the trained classifier 112, or may be a dynamic value that is updateable based on the performance of the trained classifier 112.

In some examples, the method 200 includes storing the custom loss score in association with the scenario data 114 for modifying the graph-based trained classifier 112. By storing the custom loss score with an association to the scenario data 114, and/or the control data 118, it becomes possible to retrieve the custom loss score to modify the trained classifier 112 at a later time. This data may be stored in modification data 126 and stored in the memory 102 in the test system 100.

Figure 4:
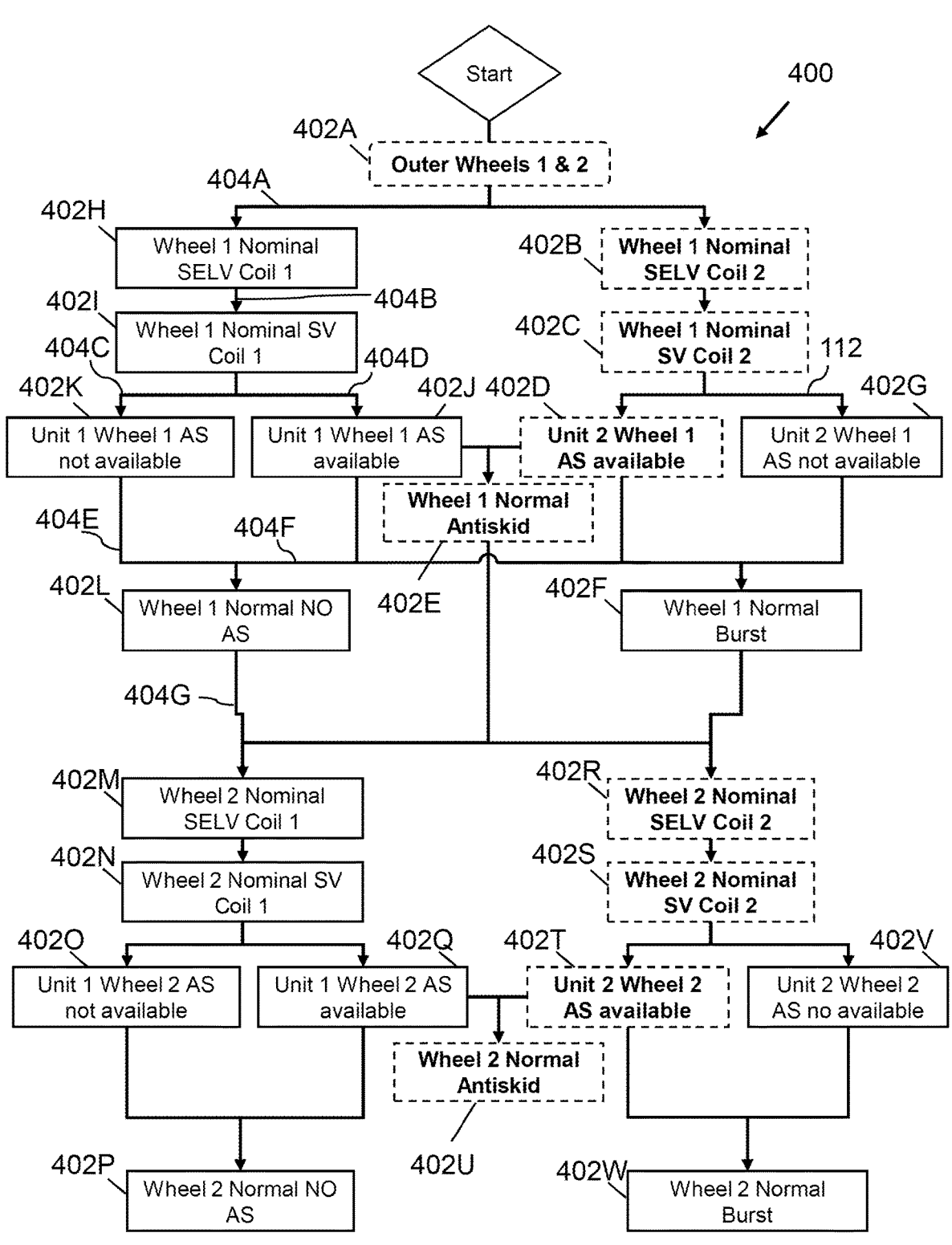
FIG. 4 is a schematic diagram illustrating a graph model according to an example in which aircraft system is a braking control system in a first scenario.

Turning now to FIG. 4, a specific example of the graph model 124 representing an aircraft system, in which the aircraft system is a braking control system is shown. It is to be appreciated that in some cases, the graph model 124 may represent a part, or portion, of an aircraft system, rather than an entire aircraft system. In the examples described in relation to FIGS. 4 to 12 below, the aircraft system is a braking control system, though it will be understood that other aircraft control systems, or more general graph-based control systems are also relevant. The graph model 400, shown in FIG. 4, comprises a set of nodes 402A to 402W connected by a corresponding set of directed edges 404A to 404G. Only five of the directed edges 404A to 404G have been labelled in the Figures for clarity. The set of nodes 402A to 402W each represent a function of a component, or a piece of equipment, in the braking control system. In the present example, each node 402A to 402W represents an operational mode of a component in the aircraft system. These operational modes may include controlling a plurality of lower-level components to provide these operational modes. However, in other examples, not shown, some or all nodes 402A to 402W may represent low-level operations, such as the actuation of a valve or switch. The directed edges 404A to 404G indicate a control flow which defines the dependencies between nodes 402A to 402W.

The part of the braking control system shown in the graph model 400 represents the braking system for a first wheel and a second wheel of an aircraft according to primary braking componentry. In particular, the nodes 402A to 402W show how different actuators and controllers in the braking control system can be activated to put each of the wheels in a normal antiskid braking mode 402E and 402U, a burst mode 402F and 402W, or a no antiskid braking mode 402L and 402P.

It is to be appreciated that the model 400 shown in FIGS. 4, 7 to 9, and 12 is simplified for the purposes of explanation, and that in a practical application the braking system may include many more modes, components, and operational outcomes than those shown in and described with respect to the graph model 400.

The control data 118 generated by the graph-based trained classifier 112 may represent nodes in the graph model 400 which are to be activated in response to a given set of operating inputs 116. The control data 118 may be mapped to the nodes 402A to 402W in the graph model 400 to identify nodes that are activated according to the respective control data 118. The activated nodes 402A to 402E and 402R to 402U are shown in FIG. 4 with broken lines. In the present example, the control data 118 has correctly controlled the braking system to put the first wheel in a normal antiskid mode 402E and to put the second wheel in a normal antiskid braking mode 402U. The activated nodes are represented of a manner in which the braking system is to be controlled to perform braking in a given scenario.

Figure 5:
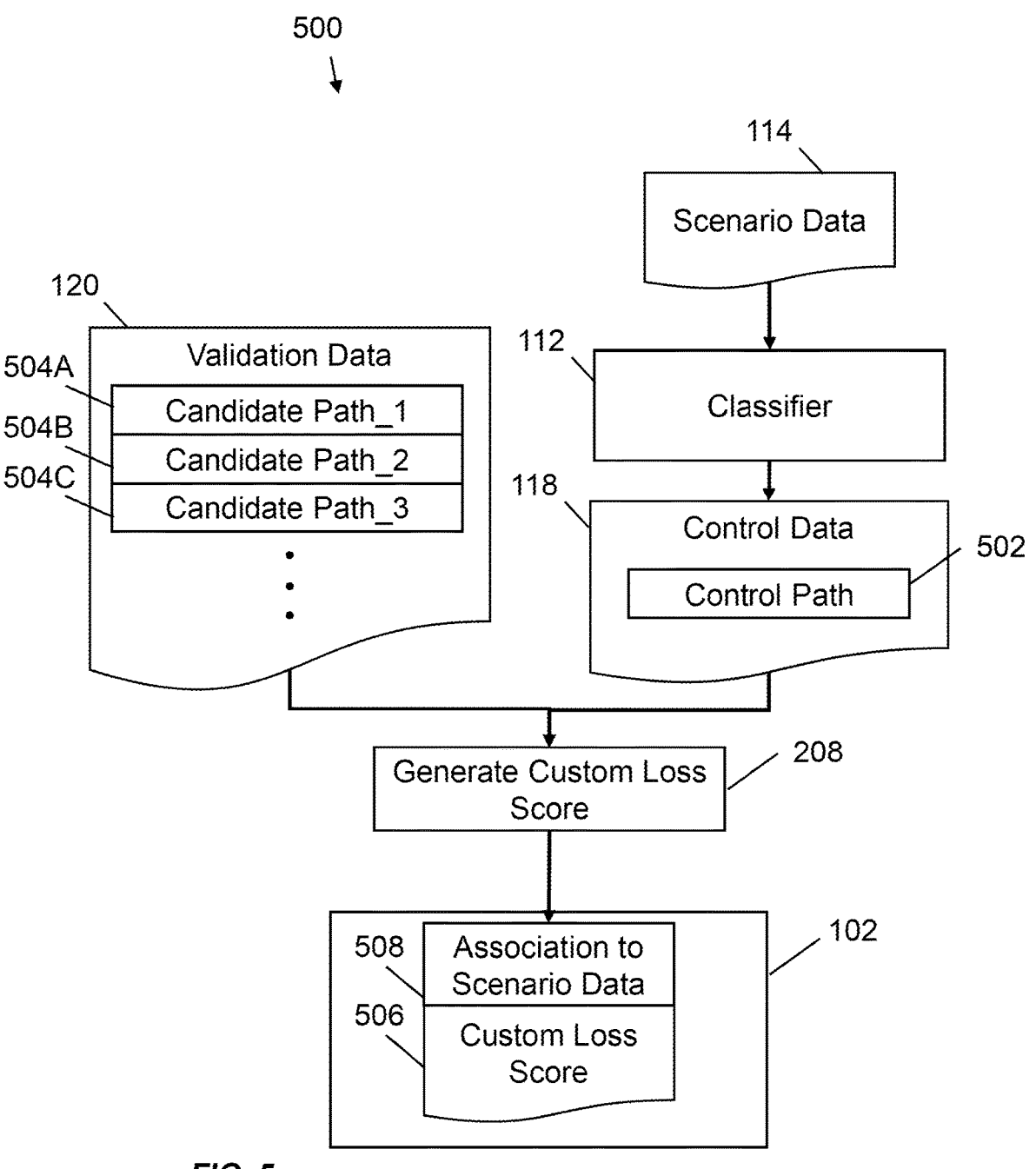
FIG. 5 is a schematic diagram showing a computer-implemented method according to an example.

FIG. 5 shows a first example of the method 200 schematically. In this example, the control data 118 represents one path for the graph model 400 representing the aircraft system. This path 502, referred to in FIG. 5 as a control path 502, includes an indication of a plurality of nodes to be activated in the graph model 400 and hence represents a manner in which the braking system to be controlled in response to the respective set of operating inputs 116. This example may be applicable where the trained classifier 112 is a multi-class classifier configured to determine a single path given a set of operating inputs 116.

The validation data 120 includes a plurality of candidate paths 504A to 504C. In this example, these candidate paths 504A and 504C each represent a potential path for the graph model 400 which excludes paths that are not viable, or include errors. In this case the paths which are excluded from the candidate paths may be paths which exhibit properties that would cause the aircraft system to be operated outside of certain design specifications or without correctly operating the aircraft system. In some examples, the candidate paths which are excluded in this case are candidate paths which would be considered erroneous regardless, or independently, of the operating inputs 116.

In some examples, the validation data 120 may include all, or at least a majority, of the possible paths in the graph model 400 that exclude those which are not viable or are otherwise intentionally omitted. These candidate paths 504A to 504C may be determined based on an inspection or evaluation of the graph model 400 representing the braking system.

Generating 208 the custom loss score 506 in this example may include comparing the control path 502 in the control data 118 to the plurality of candidate paths 504A to 504C. If the control path 502 is identical to at least one of the candidate paths 504A to 504C then the custom loss score 506 may be set to be zero, which is indicative of there being no loss between the control data 118 and the validation data 120, and hence the trained classifier 112 is behaving correctly in this scenario.

If the control path 502 is not the same as any of the candidate paths 504A to 504C then the custom loss score 506 may be set to a value that is indicative of a magnitude of difference between the control path 502 and the most similar candidate path 504A to 504C. If the control path 502 is significantly different to all of the candidate paths 504A to 504C then a large custom loss score 506 may be generated. If the differences between the control path 502 and at least one of the candidate paths 504A to 504C are relatively minor then the custom loss score 506 may be lower. The custom loss score 506 is used to modify the graph-based trained classifier.

The custom loss score 506 in this case may be calculated as a function of the integer number of differences between the node selections in the nearest candidate path 504A to 504c and the control path 502.

Figure 6:
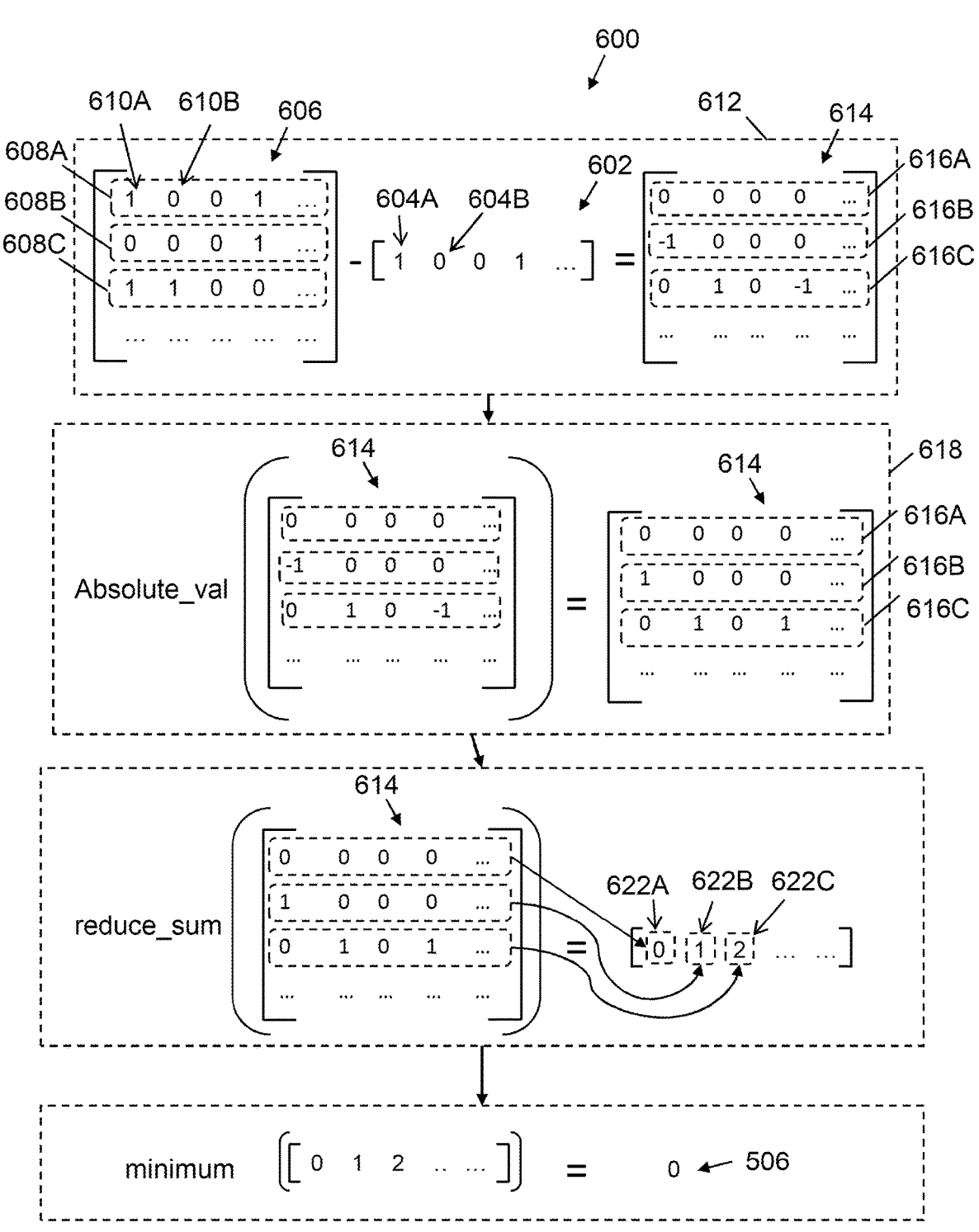
FIG. 6 is a schematic diagram showing a method for determining a custom loss score according to an example.

FIG. 6 shows an example in which the control data 118 includes a classifier output matrix 602. The classifier output matrix 602 comprises a plurality of elements 604A and 604B. Each element 604A and 604B in the classifier output matrix 602 corresponds to a respective node in the graph model 400. Only two of the elements 604A and 604B are labelled in FIG. 6 for clarity. For example, the first element 604A in the classifier output matrix 602 may correspond to a start node 402A in the graph model 400.

The elements 604A and 604B in the classifier output matrix 602 have respective values. A value provided for a respective element 604A and 604B is indicative of an operational state of the respective function of the component associated with the node in the graph model 400. For example, where the value for a given element 604A is a one, this may represent that a corresponding node in the graph model 400 is to be activated, which in turn also specifies the function of a specific component in that braking system. Where the value of a given element 604B is a zero, this may indicate that the corresponding node in the graph model 400 is not activated. The correspondence between elements 604A and 604B in the classifier output matrix 602 may be stored in a table or linked list. The arrangement and order of the elements may be consistent such that an evaluation of which nodes are activated based on a given classifier output matrix 602 can always be determined.

The validation data 120 is shown in FIG. 6 to include a path validation matrix 606. The path validation matrix 606 is segmented into portions 608A, 608B, and 608C. Each portion 608A, 608B, and 608C represents a respective candidate path for the graph model and comprises a plurality of elements 610A and 610B. In the example shown in FIG. 6, each portion 608A, 608B, and 608C is a row in the path validation matrix 606. It is to be appreciated, however, that the portions 608A, 608B, and 608C may instead be columns, or in some cases may include at least part of two or more rows or columns.

Each element 610A, 610B in a given portion 608A is corresponds to a respective node in the graph model 400. Similarly to the classifier output matrix 602, the correspondence between the elements 610A, 610B and nodes in the graph model 400 may be stored in a table, a linked list, or may be derivable from the order of the elements in the path validation matrix 606 alone. The values provided for a respective element 610A in a given portion 608A, which is to say the values of a respective element 610A, is indicative of an operational state of the respective function of a component associated with the corresponding node in the graph model 400. For example, where the value of an element 610A is a one, and the element 610A corresponds to the first node 402A, the value represents the activation, or successful activation of the node 402A in the respective path.

Providing a path validation matrix 606 and a classifier output matrix 602 which represent their respective paths for the graph model 400 in a corresponding manner enables the direct comparison of the two datasets to determine a custom loss score. In the example shown, the available value for each element in either of the matrices 602 and 606 is binary, being either zero or one. However, it is to be appreciated that in other examples, there may be more than two possible values for each element. For example, where different values represent different operational modes for each node in the graph model 400.

In the example shown in FIG. 6, generating the custom loss score 506 involves, for each portion 608A to 608C of the path validation matrix 606, performing an elementwise subtraction 612 of the classifier output matrix 602 to obtain a comparative matrix 614 that is segmented into corresponding portions 616A to 616C. It is to be appreciated that in other examples the elements in the portions of the path validation matrix 606 may be subtracted from the classifier output matrix 602. Additionally, the values assigned to different elements may be swapped as compared to those shown, such that activated nodes are represented with a zero value, and non-activated nodes are represented with a one value.

The comparative matrix 614 is then processed 618 according to a modulus function to obtain absolute values for each element in the comparative matrix 614. For each portion 616A to 616C of the processed comparative matrix, the values of the respective elements are summed 620 to determine a loss score 622A corresponding to the respective portion 616A. The loss score 622A with the lowest value is then selected 624 to be the custom loss score 506. It can be seen that, in this way, if there is a candidate path represented by a portion 608A of the path validation matrix that is identical to the path represented in the classifier output matrix 602, the custom loss score 506 will be zero. If, however, there is no candidate path 504A to 504C that is identical to the control path 502 the magnitude of the custom loss score will be proportional to the number of differences between the classifier output matrix 602 and the most similar portion 608B of the path validation matrix.

As mentioned above with respect to FIG. 2, the format and content of the validation data 120 should corresponding to the control data 118 for the custom loss score 506 to be effectively calculated as described above with respect to FIG. 6. In some examples, obtaining this validation data 120 comprises obtaining the model data 122 representing the graph model 124. In this case, that is the graph model 400 representing the braking control system. At least one candidate path 504A is then generated by selecting nodes 402A to 402W in the graph model 400 that form a path from a start node 402A to an end node 402U, 402W, or 402P. Generating the at least one candidate path 504A may exclude paths which do not satisfy a set of predetermined conditions. The candidate path 504A is then represented using a matrix 608A for which each element 610A in the matrix corresponds to a respective node in the graph model 400, and a value provided for each element is representative of an operational state of the respective function of the component associated with the respective node. Where a plurality of candidate paths 504A to 504C are generated the respective matrices 608A to 608C may be combined into a single path validation matrix 606 to be used when generating the custom loss score.

Excluding the candidate paths which do not satisfy the set of predetermined conditions may involve creating an initial set of candidate paths including all possible paths for the graph model 124 and subsequently evaluating these paths to determine which paths do not satisfy the predetermined conditions.

The predetermined conditions which are used to exclude candidate paths during the generation of the validation data 120 may be configured to penalize control behaviors in the classifier 112 which are outside of design specifications and/or relate to control behaviors deemed to be undesirable by designers of aircraft systems. For example, the predetermined conditions may be configured to exclude paths which include an operation of two components in the aircraft system that are incompatible.

Figure 7:
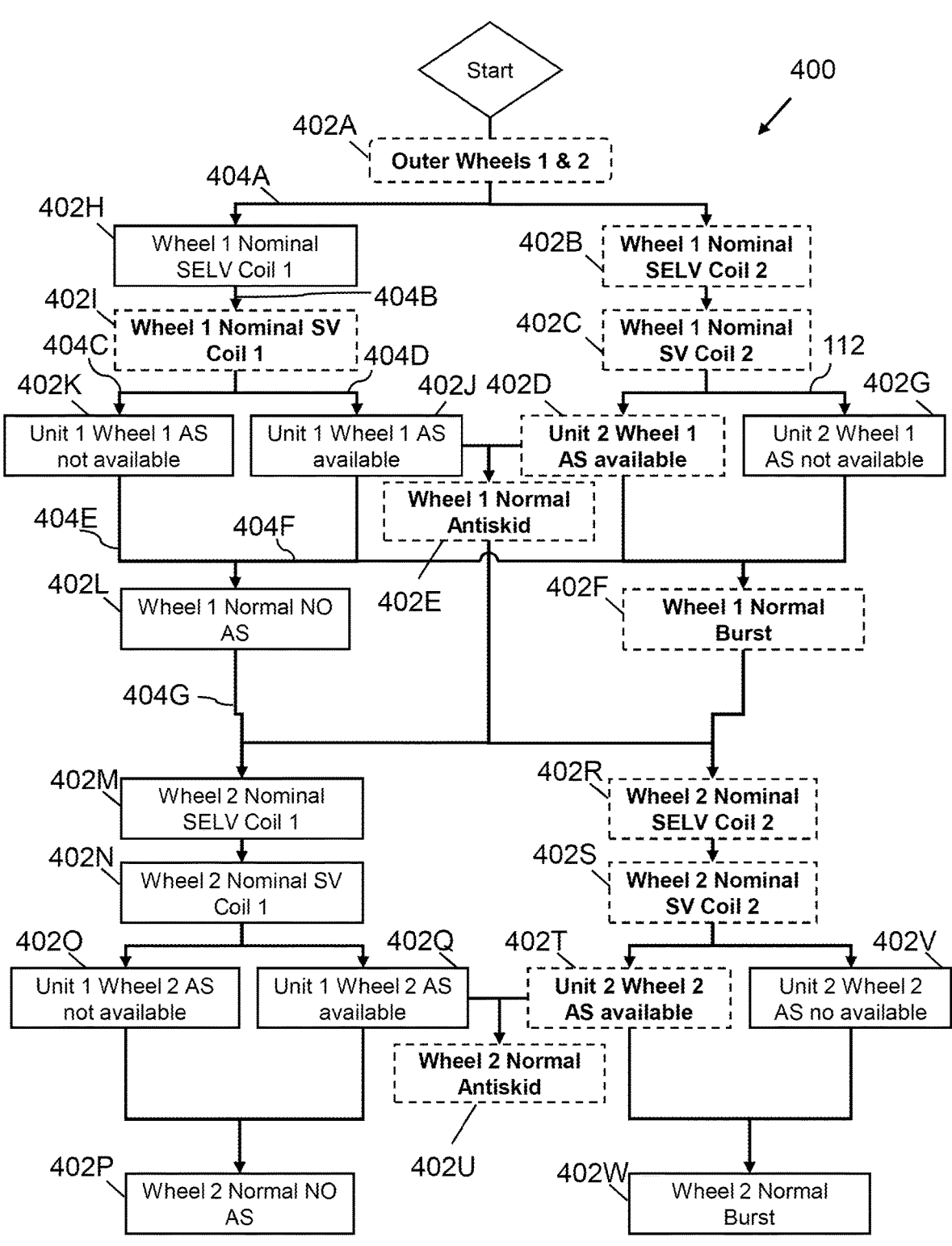
FIG. 7 is a schematic diagram illustrating a graph model according to an example in which aircraft system is a braking system in a second scenario.

FIG. 7 shows an example of a path for the graph model 400 of the braking control system which includes the operation of two components in the braking control system that are incompatible. In the present example, the path is shown in the model by representing the activated nodes 402A to 402G, 402I, 402R to 402U in broken lines. In this case, both a first coil 402I and a second coil 402C have been activated according to the path. The activation of two incompatible nodes 402I and 402C, in this case trying to operate the brake using two separate coil systems at the same time, can lead to unpredictable behaviors in the braking system and is undesirable. Hence, this behavior is categorised as an error and this path would be excluded from the validation data 120.

The predetermined conditions may alternatively, or additionally, be configured to exclude paths that include a simultaneous operation of a component in the aircraft system according to two, or more, contradictory operation modes. A path of this kind is also shown in FIG. 7. In this example, the brake for the first wheel has been operated according to both a normal antiskid mode 402E and in a burst mode 402F. It is not possible to simultaneously operate the brake for the first wheel according to two different modes and hence this is categorised as an error. Paths of this type may be referred to as including a clash.

Figure 8:
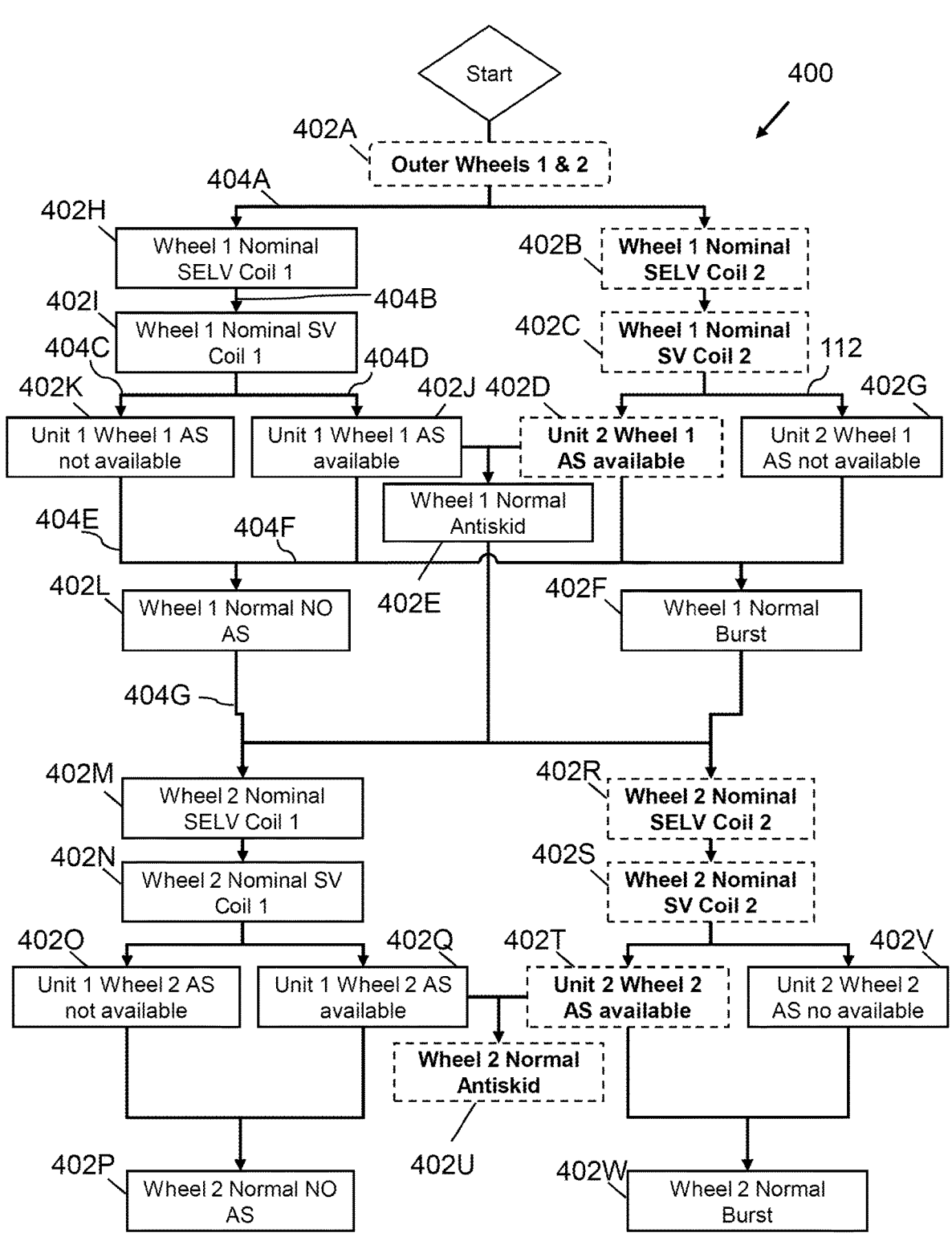
FIG. 8 is a schematic diagram illustrating a graph model according to an example in which aircraft system is a braking system in a third scenario.

The predetermined conditions may alternatively, or additionally, be configured to exclude paths which represent an incomplete operation of the aircraft system. FIG. 8 shows an example in which a path for the graph model 400 of the braking control system is incomplete and hence sufficient braking is not applied. In particular, it can be determined from an inspection of the graph model 400 that no braking is applied to the first wheel as none of the normal antiskid 402E, normal burst 402F, or normal no antiskid 402L nodes have been activated. Errors of this type, referred to as incomplete errors, may be identified by evaluating the model 400 and assessing the activated nodes 402A, 402B, 402C, 402D, 402R, 402S, 402T, 402U to determine whether each node is connected to a subsequent node by a directed edge. If two or more of the activated nodes are not connected to the two other activated nodes by a directed edge, then an incomplete error may be detected. The predetermined condition in this case may be condition on the number of connections between activated nodes.

Figure 9:
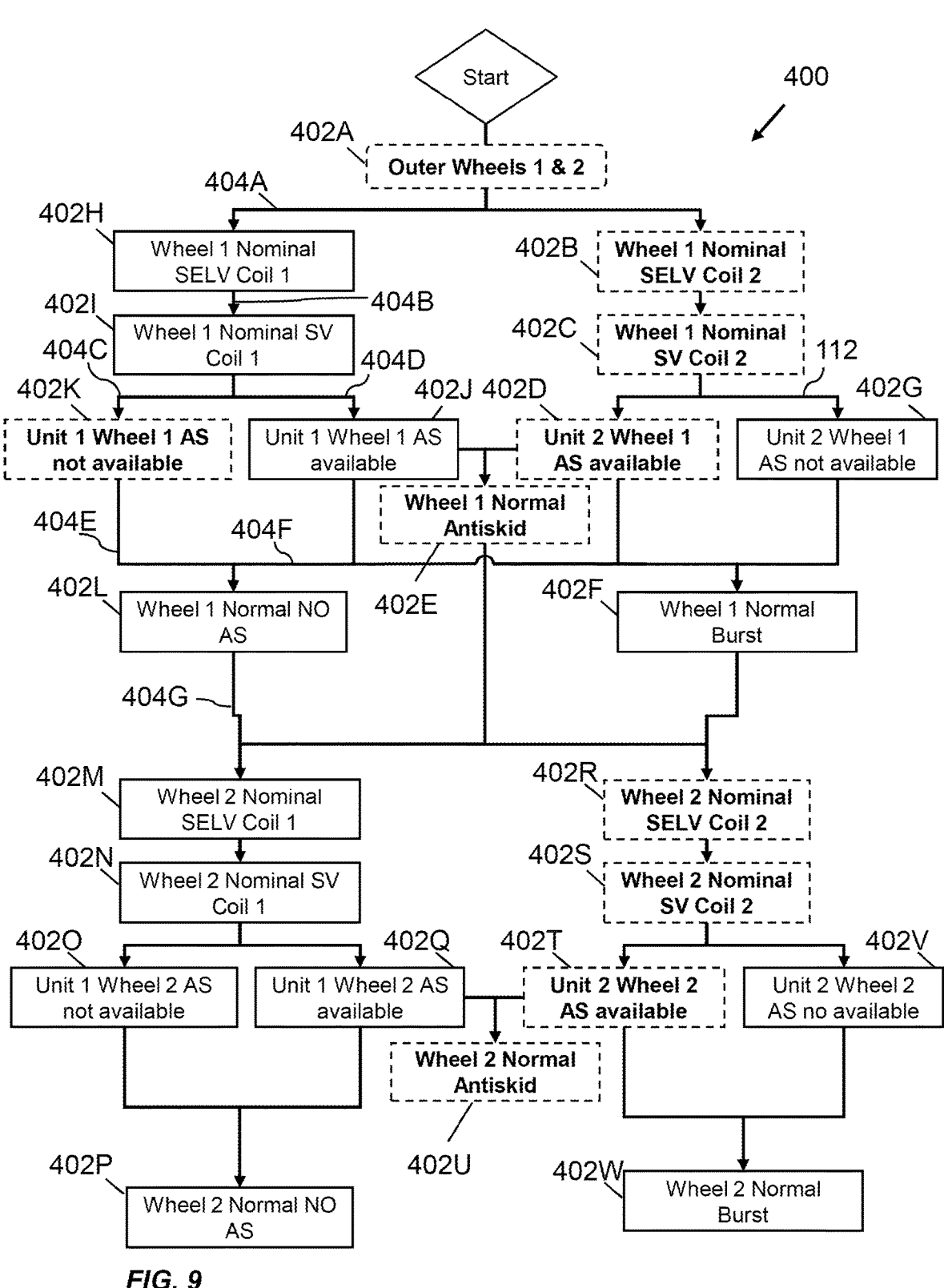
FIG. 9 is a schematic diagram illustrating a graph model according to an example in which aircraft system is a braking system in a fourth scenario.

FIG. 9 shows an example of a path which may additionally, or alternatively, be excluded from the validation data 120. In particular, FIG. 9 shows a path which includes an operation of a component in the braking system that is not related to other operated components for this path. As can be seen a node 402K representing an indication that anti-skid mode is not available for wheel 1 using the unit 1 components, has been activated according to the path. While this node 402K does not contradict or conflict with the operation of the other activated nodes in the path, its activation is unnecessary. Paths of this type may be referred to as non-simple paths as not all activated nodes follow a direct, or "simple", path from the start node 402A to an end node 402P, 402U, or 402W. While activating this node 402K may not cause any problem with controlling the aircraft operating system, such behavior may be deemed to be undesirable as it could be considered to be unpredictable.

The examples described above with respect to FIGS. 5 to 9 have been provided when considering operating inputs representing a single operating state of the aircraft. However, it will be appreciated that this process can be repeated for a plurality of scenarios. In some cases, the method 200 can be applied to a plurality of sets of operating inputs 116 simultaneously, for example, by increasing the size and/or dimensionality of the matrices 606 and 602 in the validation data 120 and the control data 118. Implementing the method 200 in this way makes it possible to increase the parallelization of the processing of the method 200 allowing the method 200 to be performed faster and more efficiently.

Figure 10:
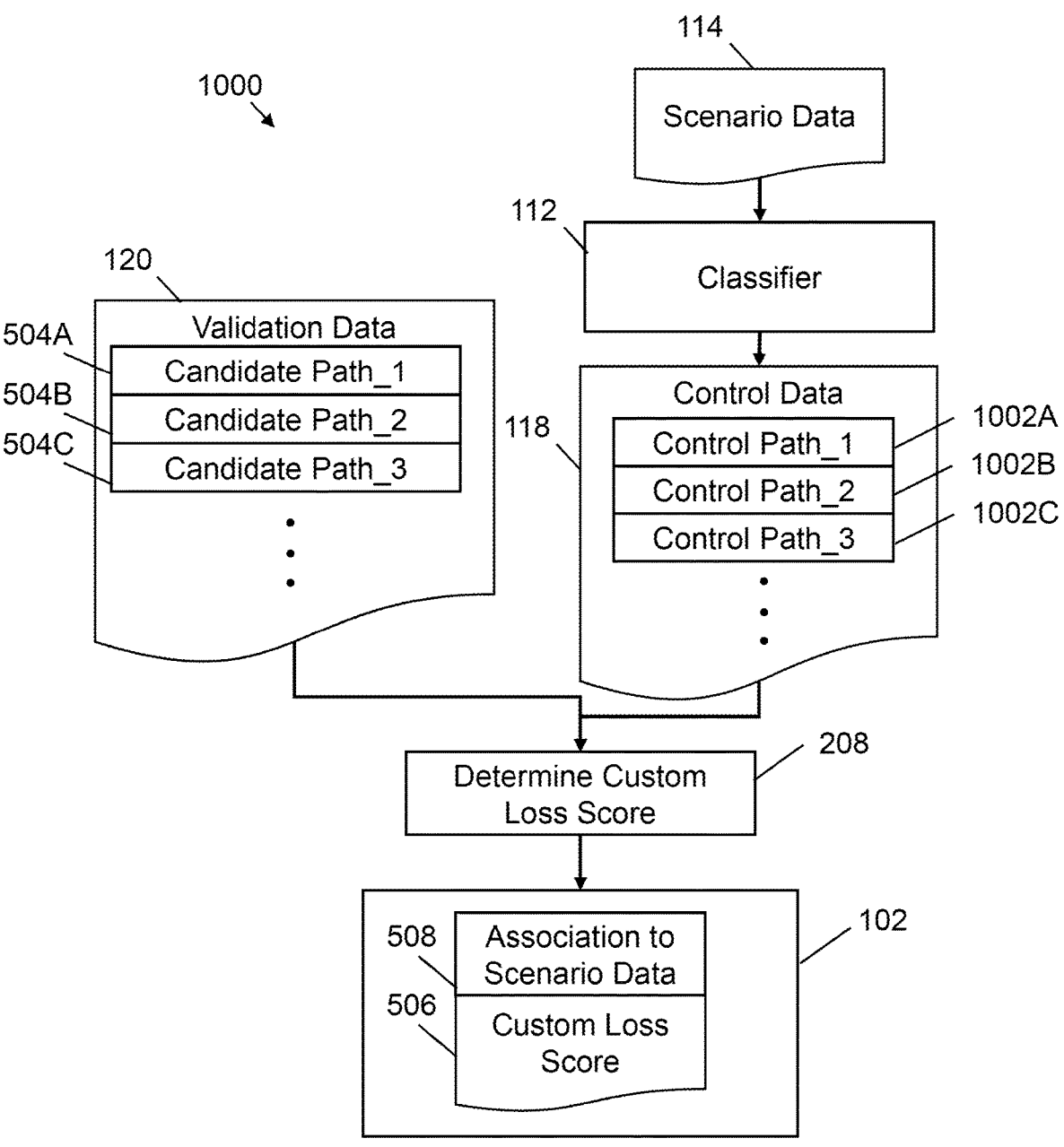
FIG. 10 is a schematic diagram showing a computer implemented method according to examples that are different to those examples shown in FIG. 5.

Turning to FIG. 10, a second example of the method 200 is shown schematically. In this example, the control data 118 represents a plurality of paths 1002A to 1002C corresponding to the set of operating inputs 116. Where the trained classifier 122 is a multi-label classifier, the output from the classifier 112 may include a ranking, or an indication of a preference, for each of a plurality of candidate paths 1002A to 1002C for the graph model 400. The candidate paths 1002A to 1002C represented in the control data 118 are labelled as control paths in FIG. 10 to distinguish them from the candidate paths in the validation data 120.

The control paths 1002A to 1002C represented in the control data 118 may correspond to the candidate paths 504A to 504C represented in the validation data 120. For example, the classifier 112 may process the candidate paths 504A to 504C along with the operating inputs 116 to determine a ranking, or other value, associated with each of the candidate paths 504A to 504C. Alternatively, the control paths 1002A to 1002C may be generated by processing the operating inputs using a multi-class classifier, in a manner as described with respect to FIGS. 5 and 6, multiple times. These candidate paths may then be ranked using a multi-label classifier to generate control data 118 that includes an indication of a preferred path.

In this example, the validation data 120 includes values associated with each of the candidate paths 504A to 504C indicative of an evaluation of the candidate paths 504A to 504C. The evaluation may be based on performance metrics, suitability, and or scenario specific restrictions to the graph model 400.

Determining 208 the loss score 506 in this case includes comparing the values in the validation data 120 indicative of the evaluation of the candidate paths 504A to 504C, with the ranking values associated with corresponding control paths 1002A to 1002C represented in the control data 118. Where a candidate path 504A to 504C in the validation data is associated with a poor evaluation, if the corresponding ranking in the control data 118 is high, then the loss score will be large as it reflects a large difference between the output of the classifier 112 and the validation data 120 for that candidate path. The control data 118 may include these rankings and/or control paths 1002A to 1002C for a subset of the total number of candidate paths 504A to 504C represented in the validation data 120.

In some examples, the control data 118 may not include an indication of the nodes activated for each control path 1002A to 1002C, as shown in FIGS. 5 and 6, but may instead include only the respective ranking value and an association to the corresponding control path 1002A to 1002C which may be stored elsewhere. Alternatively, or additionally, the validation data 120 may include values indicative of the evaluation of the candidate paths 504A to 504C and an association to the corresponding paths, but the indication of the activated nodes for each path may be stored elsewhere.

Figure 11:
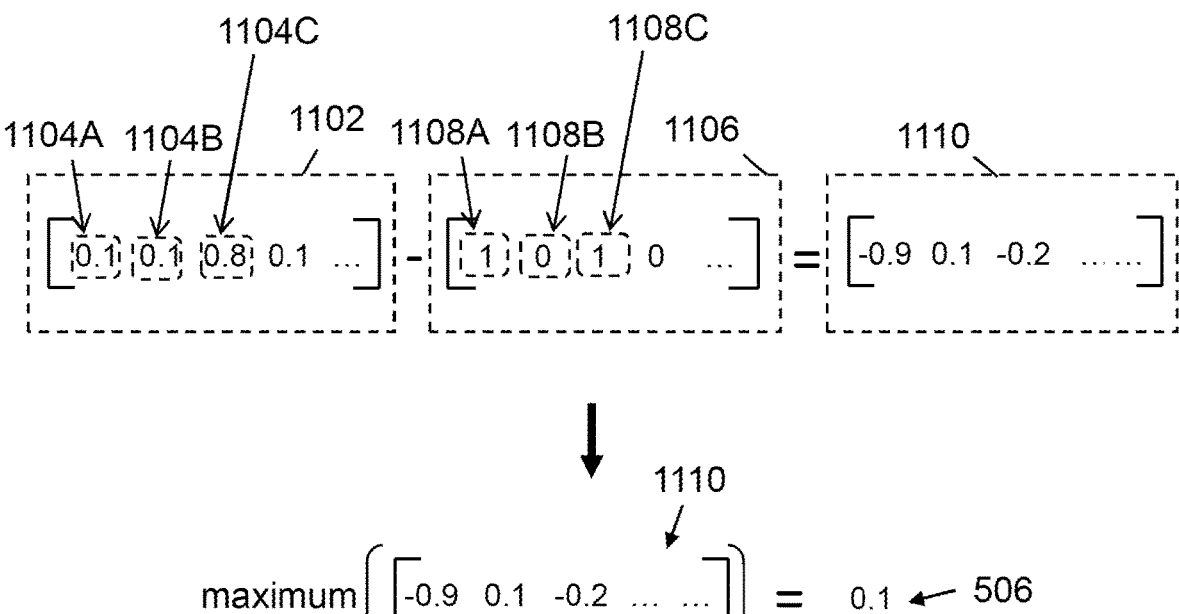
FIG. 11 is a schematic diagram showing a method for determining a custom loss score according to examples that are different to those examples shown in FIG. 6.

FIG. 11 shows a specific example of determining a custom loss score 506 according to the examples described with respect to FIG. 10, in which the classifier 112 is a multi-label classifier. In the example shown in FIG. 11, the control data 118 includes a classifier output matrix 1102 that comprises a plurality of elements. Each element 1104A to 1104C in the classifier output matrix 1102 corresponds to a respective path for the graph model 400. As described above with respect to FIG. 10, these paths may correspond to the paths in the validation data 120 and/or may be generated using a multiclass classifier such as that described with respect to FIGS. 5 and 6.

The values provided for each element 1104A to 1104C in the classifier output matrix 1102 represent a preference for the respective path. The preference may also be referred to as a ranking, a likelihood, and so forth. In this example, the element 1104C with the highest value is representative of the most preferred path, or top ranked path, by the classifier 112. The element with the lowest value is the least preferred, or lowest ranked, path. Which is to say that the magnitude of the value of an element 1104A to 1104C corresponds to the favorability of the corresponding path as determined by the classifier 112. In this example, the values are normalized to be between zero and one, though it will be appreciated that alternative value ranges may be possible.

The validation data 120 includes a path validation matrix 1106 that comprises a plurality of elements 1108A to 1108C. Each element 1108A to 1108C in the path validation matrix 1106 represents a candidate path 504A to 504C for the graph model 400. A value provided for each element 1108A to 1108C is indicative of an evaluation of the path according to a condition. The validation data 120 used in this example may include elements in the path validation matrix 1102 only for candidate paths 504A to 504C which were not excluded according to the method for generating the validation data 120 described above with respect to FIGS. 5 and 6.

Obtaining the validation data 120 in this case may include obtaining at least one candidate path 504A to 504C for the graph model, wherein the candidate paths 504A to 504C exclude those candidate paths which do not satisfy a set of predetermined conditions, as described above. The candidate paths 504A to 504C may then be evaluated to assign a value to the candidate path 504A to 504C based on whether the candidate path 504A to 504C is indicative of an operation of a component in the aircraft system in a manner that is incompatible with the set of operating inputs 116. The path validation matrix 1106 may then be generated using the values assigned to the candidate paths 504A to 504C. In the example shown in FIG. 11, candidate paths which are compatible with set of operating inputs 116 are assigned a value of one, and candidate paths which are not compatible are assigned a value of zero.

Figure 12:
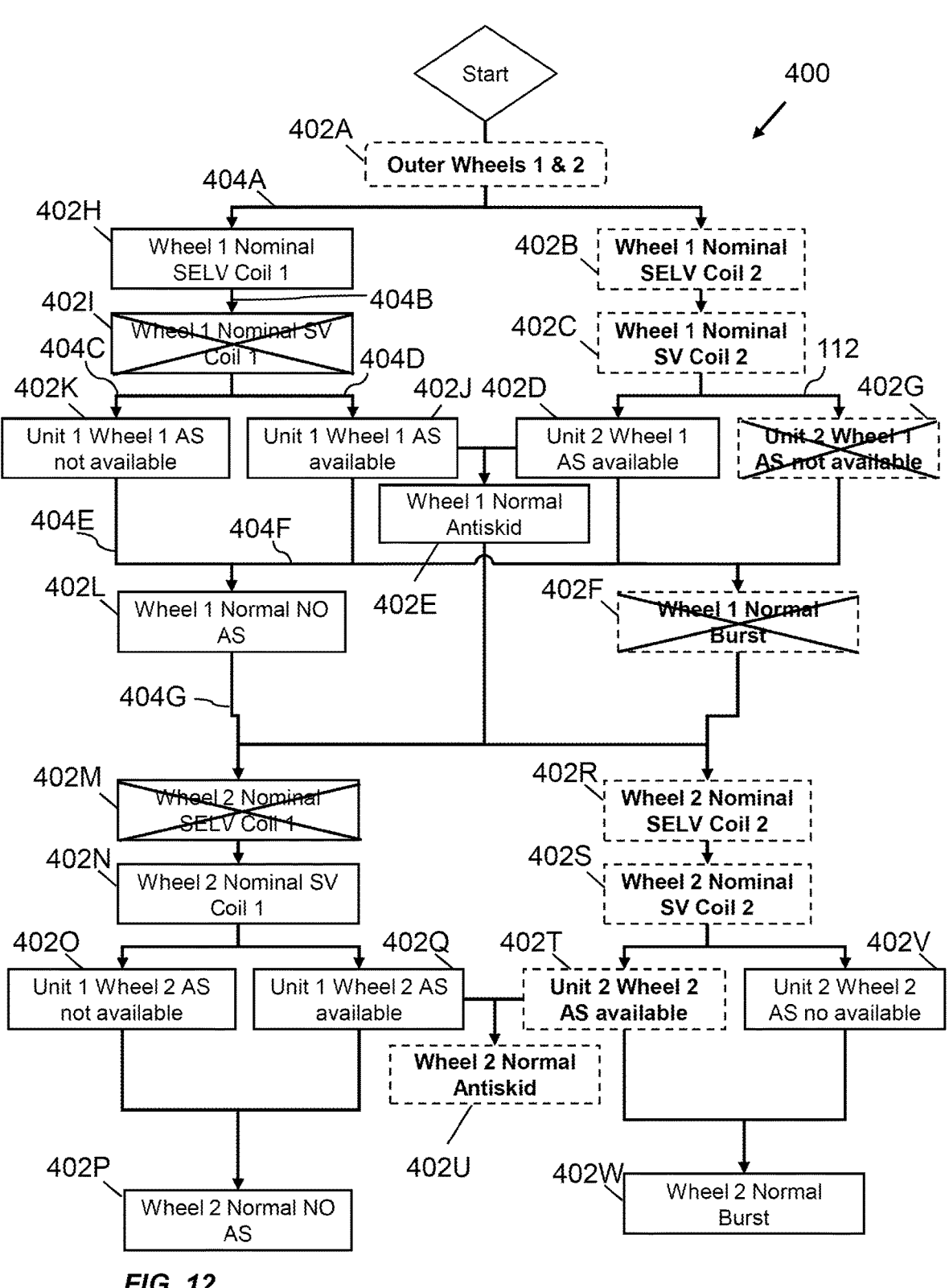
FIG. 12 is a schematic diagram illustrating a graph model according to an example in which aircraft system is a braking system in a given scenario and shows respective operating inputs and control data applied to the graph model.

Turning briefly to FIG. 12 a candidate path which is indicative of an operation of a component in the aircraft system in a manner that is incompatible with the given scenario, as determined by the operating inputs 116, is shown. The candidate path has been mapped to respective nodes 402A, 402B, 402C, 402G, 402F, 402R, 402S, 402T, 402U and shown in broken lines. In this scenario several of the nodes 402I, 402M, 402G, 402F in the graph model 400 are not available to be activated, these are shown in FIG. 12 with a cross through the node. The inability to activate a nodes 402I, 402M, 402G, 402F may be due to failures in associated components in the braking system, environmental constraints in the given scenario, and so forth. Restrictions on nodes that can and/or cannot be activated may vary between scenarios. In some examples, respective operating inputs 116 for this scenario may include an indication of which nodes 402I, 402M, 402G, 402F cannot be successfully activated. The graph model 400 has been modified to reflect these restrictions represented in the operating inputs 116. An operation of the model 400 is then evaluated, for example, by evaluating which nodes have been activated using the candidate path. If any of the activated nodes 402A, 402B, 402C, 402G, 402F, 402R, 402S, 402T, 402U match the nodes 402I, 402M, 402G, 402F which are unavailable in the present scenario, then it may be determined that the braking system is being operating in a manner that is incompatible with the set of operating inputs 116 and this candidate path will be assigned a value of zero in the path validation matrix 1106.

Returning to the example of FIG. 11, generating the custom loss score comprises performing an elementwise subtraction of the path validation matrix 1106 from the classifier output matrix 1102 to obtain a loss calculation matrix 1110. In this process, elements 1108A to 1108C in the path validation matrix 1108 are subtracted from elements 1104A to 1104C in the loss calculation matrix 1102 that represent corresponding paths for the graph model 400. In FIG. 11, the order of the elements 1104A to 1104C and 1108A to 1108C in each of the path validation matrix and the classifier output matrix are linked to the respective candidate paths to which the values relate. In other cases, a referencing system such as a table, a linked list, or a key system is used to indicate which elements in each of the matrices 1102 and 1008 correspond to which candidate paths. This ensures that elements in the path validation matrix 1106 are compared to, which in this case includes being subtracted form, elements in the classifier output matrix 1102 which correspond to the same candidate path 504A to 504C.

A value is then selected from the loss calculation matrix 1110 to be the custom loss score 506, and used to modify the graph-based trained classifier 112. In the example shown in FIG. 11, the values in classifier output matrix 1102 are each normalized to a scale of between zero and one, and the values in the path validation matrix are either zero or one. In this case, the selection includes applying a maximum function to select the largest value from the loss calculation matrix. However, it will be appreciated that in other cases the values of zero and one may be swapped in the path validation matrix 1106 and a minimum function may be used instead. Other mathematical operations are also possible for generating the custom loss score, and it will be appreciated that the specific functions used will be dependent on the values used to represent the candidate paths in the classifier output matrix 1102 and the path validation matrix 1106. In some examples, the custom loss score which is selected is the loss score which represents the greatest difference between the output of the classifier 112 and the validation data 120. It will be appreciated, however, that in some cases other loss scores may be selected and/or a plurality of loss scores may be selected to be the custom loss score.

In the example described with respect to FIGS. 10 to 12 a single set of operating inputs 116 have been considered. It will be appreciated that the method 200 may be applied to a plurality of sets of operating inputs 116. For each set of operating inputs, a new path validation matrix 1106 would be generated to reflect which candidate paths are viable under the scenario represented by the respective operating inputs 116. The path validation matrices 1106 in this case may also be combined into a single matrix and/or parallelized for efficiency.

The method 200 may additionally involve deploying the trained classifier 200 in an aircraft control system after it has been modified according to the examples described herein.

FIG. 13 shows a non-transitory computer-readable storage medium 1300 comprising computer-executable instructions 1302 to 1310 which, when executed by a processor 1312, cause the processor 1312 to perform the method 200. A first set of instructions 1302 causes the processor to obtain scenario data 114 comprising a set of operating inputs 116 representing an operating state of an aircraft. A second set of instructions 1304 cause the processor 1312 to obtain control data 118 representing a path for the graph 124 model that corresponds to the scenario data 114. A third set of instructions 1306 obtaining validation data 120 representing a set of candidate paths for the graph model 124. A fourth set of instructions 1308 cause the processor 1312 to generate a custom loss score based on differences between the validation data 120 and the control data 118. A fifth set of instructions 1310 cause the processor 1312 to modify the graph-based trained classifier 112 based on the custom loss score, the scenario data, and the control data. Variations and examples of the method 200 described above also apply to the instructions 1302 to 1310 stored on the storage medium 1312.

It will be appreciated that while the majority of examples described herein relate to the application of these processes to trained classifiers for aircraft control systems, these methods may be more generally applicable to any control system capable of being represented according to a graph model. For example, manufacturing or logistics processes may also be represented using graph-models. Custom loss functions that penalize the operation, by a trained classifier, of these control systems outside of normal operational modes may be implemented according to the methods described herein and used to modify these classifiers.

It should be understood that modifications, substitutions and alternatives of the invention(s) may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A test system for modifying a graph-based trained classifier that is configured to control an aircraft system according to a graph model representing the aircraft system, wherein the graph-based trained classifier is configured to output control data for controlling the aircraft system in response to a set of operating inputs representing an operating state of an aircraft, the control data representing a path for the graph model, and wherein the test system comprises at least one memory and at least one processor, the test system comprising program code stored in the at least one memory and that, when executed by the at least one processor, causes the test system to:

obtain scenario data comprising a set of operating inputs representing an operating state of an aircraft;

obtain control data representing a path for the graph model that corresponds to the scenario data;

obtain validation data representing a set of candidate paths for the graph model;

generate a custom loss score based on differences between the validation data and the control data, wherein an absolute value of the custom loss score reflects a degree to which the control data deviates from the validation data; and modify the graph-based trained classifier based on the custom loss score, the scenario data, and the control data.

2. The test system according to claim 1, wherein the graph model comprises a set of nodes connected by a corresponding set of edges, and wherein each node represents a function of a component in the aircraft system.

3. The test system according to claim 2, wherein obtaining the control data comprises processing the set of operating inputs using the graph-based trained classifier, and wherein the control data includes a classifier output matrix comprising a plurality of elements, each element in the classifier output matrix corresponds to a respective node in the graph model, and a value provided for the element is indicative of an operational state of the respective function of the component associated with the respective node.

4. The test system according to claim 3, wherein the validation data includes a path validation matrix, the path validation matrix being segmented into portions, each portion representing a respective candidate path for the graph model and comprising a plurality of elements, each element in the portion of the path validation matrix corresponds to a respective node in the graph model, and a value provided for the element in the portion is indicative of an operational state of the respective function of a component associated with the respective node.

5. The test system according to claim 4, wherein generating the custom loss score comprises:

for each portion of the path validation matrix, performing an elementwise subtraction of the classifier output matrix to obtain a comparative matrix that is segmented into corresponding portions;

processing the comparative matrix according to a modulus function to obtain absolute values for each element in the comparative matrix;

for each portion of the comparative matrix, summing the values of the respective elements to determine a loss score for the respective portion; and selecting the loss score with a lowest value to be the custom loss score.

6. The test system according to claim 4, wherein each portion of the path validation matrix is a row in the path validation matrix or each portion of the path validation matrix is a column in the path validation matrix.

7. The test system according to claim 4, wherein obtaining the validation data comprises:

obtaining model data representing the graph model of the aircraft system;

generating at least one candidate path by selecting nodes in the graph model that form a path from a start node to an end node, wherein generating the at least one candidate path excludes paths which do not satisfy a set of predetermined conditions; and representing the candidate path using a matrix for which each element in the matrix corresponds to a respective node in the graph model, and a value provided for each element represents an operational state of the function of the component associated with the respective node.

8. The test system according to claim 7, wherein the set of predetermined conditions are configured to exclude paths which correspond to at least one of the following:

include an operation of two components in the aircraft system that are incompatible;

include a simultaneous operation of a component in the aircraft system according to two contradictory operation modes;

include an operation of a component in the aircraft system that is not related to other operated components; or represent an incomplete operation of the aircraft system.

9. The test system according to claim 4, wherein generating the custom loss score based on differences between the validation data and the control data involves performing an elementwise comparison of the classifier output matrix with each portion of the path validation matrix.

10. The test system according to claim 1, wherein the control data represents a plurality of paths corresponding to the set of operating inputs, and wherein the control data includes a classifier output matrix comprising a plurality of elements, each element in the classifier output matrix corresponds to a respective path for the graph model, and wherein a value provided for each element in the classifier output matrix represents a preference for the respective path.

11. The test system according to claim 10, wherein the validation data includes a path validation matrix comprising a plurality of elements, each element in the path validation matrix corresponding to a candidate path for the graph model, and wherein a value provided for each element is indicative of an evaluation of the path according to a condition.

12. The test system according to claim 11, wherein generating the custom loss score comprises:

performing an elementwise subtraction of the path validation matrix from the classifier output matrix to obtain a loss calculation matrix, wherein elements in the path validation matrix are subtracted from elements in the classifier output matrix that represent corresponding paths for the graph model; and selecting a value of an element in the loss calculation matrix as the custom loss score.

13. The test system according to claim 11, wherein obtaining the validation data comprises:

obtaining at least one candidate path for the graph model, wherein the candidate paths exclude paths which do not satisfy a set of predetermined conditions;

evaluating the at least one candidate path and assigning a value to the candidate path based on whether the candidate path is indicative of an operation of a component in the aircraft system in a manner that is incompatible with the set of operating inputs; and generating the path validation matrix using the value assigned to the candidate path.

14. A computer-implemented method for modifying a graph-based trained classifier configured to control an aircraft system according to a graph model representing the aircraft system, wherein the graph-based trained classifier is configured to output control data for controlling the aircraft system in response to a set of operating inputs representing an operating state of an aircraft, the control data being representing a path for the graph model, and wherein the method comprises:

obtaining scenario data comprising a set of operating inputs representing an operating state of an aircraft;

obtaining control data representing a path for the graph model that corresponds to the scenario data;

obtaining validation data representing a set of candidate paths for the graph model;

generating a custom loss score based on differences between the validation data and the control data, wherein an absolute value of the custom loss score reflects a degree to which the control data deviates from the validation data; and modifying the graph-based trained classifier based on the custom loss score, the scenario data, and the control data.

15. The computer-implemented method according to claim 14, wherein the graph model comprises a set of nodes connected by a corresponding set of edges, and wherein each node represents a function of a component in the aircraft system.

16. The computer-implemented method according to claim 15, wherein obtaining the control data comprises processing the set of operating inputs using the graph-based trained classifier, and wherein the control data includes a classifier output matrix comprising a plurality of elements, each element in the classifier output corresponding to a respective node in the graph model, and a value provided for the element is indicative of an operational state of the respective function of the component associated with the respective node.

17. The computer-implemented method according to claim 16, wherein the validation data includes a path validation matrix, the path validation matrix being segmented into portions, each portion representing a respective candidate path for the graph model and comprising a plurality of elements, each element in the portion of the path validation matrix corresponds to a respective node in the graph model, and a value provided for the element in the portion is indicative of an operational state of the respective function of a component associated with the respective node.

18. The computer-implemented method according to claim 17, wherein generating the custom loss score comprises:

for each portion of the path validation matrix, performing an elementwise subtraction of the classifier output matrix to obtain a comparative matrix that is segmented into corresponding portions;

processing the comparative matrix according to a modulus function to obtain absolute values for each element in the comparative matrix;

for each portion of the comparative matrix, summing the values of the respective elements to determine a loss score for the respective portion; and selecting the loss score with the lowest value to be the custom loss score.

19. The computer-implemented method according to claim 14, wherein the control data represents a plurality of paths corresponding to the set of operating inputs, and wherein the control data includes a classifier output matrix comprising a plurality of elements, each element in the classifier output matrix corresponds to a respective path for the graph model, and wherein a value provided for each element in the classifier output matrix represents a preference for the respective path.

20. The computer-implemented method according to claim 19, wherein the validation data includes a path validation matrix comprising a plurality of elements, each element in the path validation matrix corresponding to a candidate path for the graph model, and wherein a value provided for each element is indicative of an evaluation of the path according to a condition.

21. The computer-implemented method according to claim 20, wherein generating the custom loss score comprises:

performing an elementwise subtraction of the path validation matrix from the classifier output matrix to obtain a loss calculation matrix, wherein elements in the path validation matrix are subtracted from elements in the classifier output matrix that represent corresponding paths for the graph model; and selecting a value of an element in the loss calculation matrix to be the custom loss score.

22. The computer-implementing method according to claim 14, further comprising deploying the graph-based trained classifier in an aircraft control system.

23. A computer-implemented method for modifying a graph-based trained classifier for operating a control system according to a graph model representing the control system, wherein the graph-based trained classifier is configured to output control data in response to a set of operating inputs representing an operating scenario for the control system, the control data representing a path for the graph model, and wherein the method comprises:

obtaining scenario data comprising a set of operating inputs representing an operational state of the control system;

obtaining control data representing a respective path for the graph model that corresponds to the scenario data;

obtaining validation data representing a set of candidate paths for the graph model;

generating a custom loss score based on differences between the validation data and the control data, wherein an absolute value of the custom loss score reflects a degree to which the control data deviates from the validation data; and modifying the graph-based trained classifier based on the custom loss score, the scenario data, and the control data.

* * * * *